United States Patent
Fujii et al.

(10) Patent No.: US 9,458,892 B2
(45) Date of Patent: Oct. 4, 2016

(54) ELECTROMAGNETIC CLUTCH DEVICE

(71) Applicant: JTEKT Corporation, Osaka-shi (JP)

(72) Inventors: Noriyuki Fujii, Hekinan (JP);
Kunihiko Suzuki, Gamagori (JP);
Hiroshi Takuno, Nukata-gun (JP)

(73) Assignee: JTEKT CORPORATION, Osaka-shi (JP)

( * ) Notice: Subject to any disclaimer, the term of this patent is extended or adjusted under 35 U.S.C. 154(b) by 40 days.

(21) Appl. No.: 14/483,842

(22) Filed: Sep. 11, 2014

(65) Prior Publication Data
US 2015/0068862 A1    Mar. 12, 2015

(30) Foreign Application Priority Data

| Sep. 12, 2013 | (JP) | ................................. | 2013-189159 |
| Sep. 12, 2013 | (JP) | ................................. | 2013-189160 |
| Sep. 12, 2013 | (JP) | ................................. | 2013-189161 |

(51) Int. Cl.
*F16D 23/06* (2006.01)
*F16D 11/14* (2006.01)
(Continued)

(52) U.S. Cl.
CPC ............... *F16D 11/14* (2013.01); *F16D 23/06* (2013.01); *F16D 27/118* (2013.01); *F16D 2011/002* (2013.01); *F16D 2011/008* (2013.01)

(58) Field of Classification Search
CPC ............................. F16D 27/09; F16D 27/118
USPC ...................................................... 192/84.92
See application file for complete search history.

(56) References Cited

U.S. PATENT DOCUMENTS

| 6,450,915 B1 | 9/2002 | Kazaoka et al. | |
| 2003/0162622 A1* | 8/2003 | Fusegi | B60K 23/04 475/231 |

(Continued)

FOREIGN PATENT DOCUMENTS

| EP | 1 388 682 A1 | 2/2004 |
| EP | 2 565 483 A2 | 3/2013 |
| JP | 2001-80385 | 3/2001 |

(Continued)

OTHER PUBLICATIONS

Extended Search Report issued Dec. 3, 2015 in European Patent Application No. 14183652.8.

*Primary Examiner* — Robert Hodge
*Assistant Examiner* — Stacey Fluhart
(74) *Attorney, Agent, or Firm* — Oblon, McClelland, Maier & Neustadt, L.L.P

(57) ABSTRACT

An electromagnetic clutch device includes: a meshing member; an electromagnetic coil; an armature; a cylindrical cam member; and a locking portion. The cam member is provided with a plurality of locked portions to be locked by the locking portion at different axial positions, such that the plurality of locked portions is formed adjacent to each other in a circumferential direction; the cam member rotates only by a first predetermined angle due to an axial movement of the armature from a first position to a second position, and the cam member further rotates only by a second predetermined angle due to a movement of the armature from the second position to the first position; and when locking of the locking portion is shifted from one of the plurality of locked portions to another locked portion circumferentially adjacent thereto so that the locking portion locks the another locked portion at a different axial position, the second meshing portion is meshed with the first meshing portion.

23 Claims, 24 Drawing Sheets

(51) Int. Cl.
*F16D 27/118* (2006.01)
*F16D 11/00* (2006.01)

(56) References Cited

U.S. PATENT DOCUMENTS

2012/0222933 A1* 9/2012 Abousleiman ........ F16D 25/061
192/69.5

2014/0190781 A1* 7/2014 Lawson ................ F16D 27/118
192/69.8

FOREIGN PATENT DOCUMENTS

| JP | 2010-164175 | 7/2010 |
| JP | 2010-254058 | 11/2010 |
| WO | WO 2005/106272 A1 | 11/2005 |

* cited by examiner

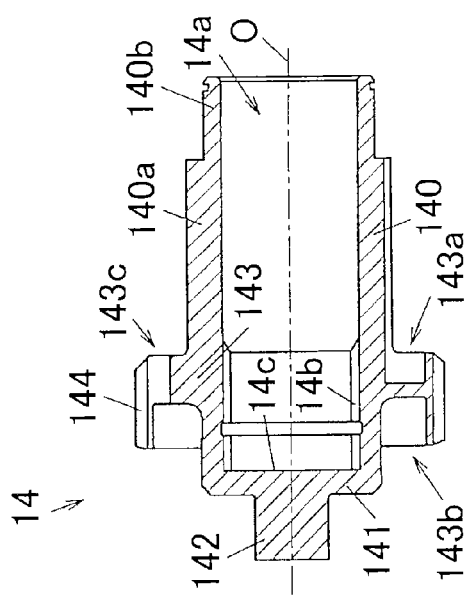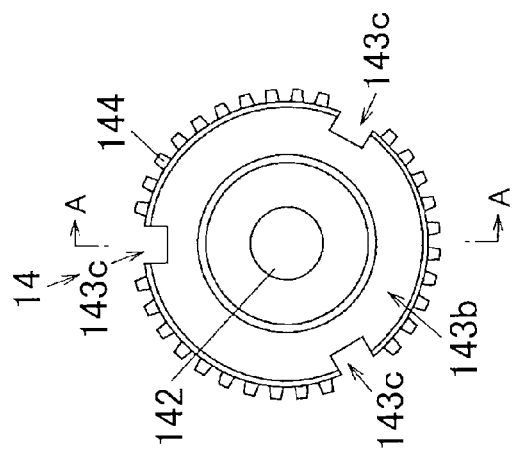

ELECTROMAGNETIC CLUTCH DEVICE

INCORPORATION BY REFERENCE

The disclosure of Japanese Patent Application No. 2013-189159, 2013-189160 and 2013-189161 filed on Sep. 12, 2013 including the specification, drawings and abstract is incorporated herein by reference in its entirety.

BACKGROUND OF THE INVENTION

1. Field of the Invention

The present invention relates to an electromagnetic clutch device operated by a magnetic force of an electromagnetic coil.

2. Description of Related Art

There has been described a clutch device configured to switch between transmission and cutoff of a torque by electromagnetic means (see Japanese Patent Application Publication No. 2001-80385 (JP 2001-80385 A), Japanese Patent Application Publication No. 2010-164175 (JP 2010-164175 A), Japanese Patent Application Publication No. 2010-254058 (JP 2010-254058 A)).

A driving force switch mechanism described in JP 2001-80385 A is provided in a driving-force transmission path of a vehicle and functions as a clutch device for switching between a two-wheel-drive state and a four-wheel-drive state. The driving force switch mechanism includes an actuator including an electric motor and a speed reducer, a rack for converting a rotation of an output gear of the actuator into an axial displacement, and a sleeve spline-engaged with a first rotational member and a second rotational member due to an axial movement of the rack. When the first rotational member is connected to the second rotational member in a torque transmittable manner, a current is supplied to an electric motor so as to axially move the rack by the rotation of the output gear decelerated by the speed reducer, thereby causing the sleeve to be spline-engaged with the first rotational member and the second rotational member. Hereby, the driving-force transmission path of a drive source of the vehicle is switched, so that a drive state of the vehicle is switched from the two-wheel-drive state to the four-wheel-drive state.

Further, a tooth clutch described in JP 2010-164175 A includes a yoke for retaining an exciting coil, an armature drawn toward a yoke side by a magnetic force, and a pulley that rotate integrally with the armature by a biasing force of a leaf spring, and is configured such that a torque is transmitted by meshing between mound-shaped toothing portions formed on respective facing surfaces of the yoke and the armature.

A driving force transmission device described in JP 2010-254058 A includes: an actuator including an electric motor and a speed reducer; a pinion gear rotationally driven by the actuator; a shift rod driven axially via a rack gear meshed with the pinion gear; and a coupling sleeve to be switched between a coupled state in which the coupling sleeve is meshed with a clutch gear by reciprocation by a shift fork mounted in the shift rod and an uncoupled state in which the coupling sleeve is uncoupled from the clutch gear. The coupling sleeve and the clutch gear constitute a meshing clutch mechanism. In a state where the coupling sleeve is meshed with the clutch gear, a four-wheel-drive state where a driving force is transmitted to front and rear wheels is achieved. When the coupling sleeve is uncoupled from the clutch gear, a two-wheel-drive state where a driving force is transmitted only to the front wheels is achieved. Further, a spring for biasing the shift rod and the shift fork in a coupling direction where the coupling sleeve is coupled to the clutch gear is disposed between the shift rod and a case member.

At the time when the four-wheel drive state switches to the two-wheel-drive state, a pinion gear is rotationally driven by an electric motor, so that the coupling sleeve is meshed with the clutch gear against a biasing force of the spring. Further, at the time when the two-wheel drive state switches to the four-wheel-drive state, the shift fork is changed into a free state, so that the coupling sleeve is pressed against an end surface of the clutch gear by the biasing force of the spring, and when a rotation of the coupling sleeve is synchronized with a rotation of the clutch gear, the coupling sleeve is meshed with the clutch gear by the biasing force of the spring.

SUMMARY OF THE INVENTION

In the meantime, in a case where wheel assemblies skid while a vehicle is running on a low μ road such as a wet road surface in the two-wheel-drive state, it is necessary to switch the two-wheel-drive state to the four-wheel-drive state quickly so as to stabilize the running of the vehicle. However, the technique described in JP 2001-80385 A may cause such a problem that a rotation of a rotor of the electric motor is decelerated and is output from the output gear, and a rotation of the output gear is converted into an axial displacement by the rack so that the sleeve axially moves, which may result in that the switching to the four-wheel drive state is not necessarily performed quickly. In view of this, such an electromagnetic clutch device has been demanded that is able to quickly switch between a coupled state in which the first rotational member is coupled to the second rotational member and an uncoupled state in which the first rotational member and the second rotational member are rotatable relative to each other.

Note that, in the tooth clutch described in JP 2010-164175 A, when the toothing portions are directly meshed with each other by an axial movement of the armature, it is possible to quickly switch between the coupled state and the uncoupled state. However, in the clutch configured as such, it is difficult to transmit a large torque such as a driving force of the vehicle, for example.

Further, in a case where wheel assemblies skid while a vehicle is running on a low μ road such as a wet road surface in the two-wheel-drive state, it is necessary to switch the two-wheel-drive state to the four-wheel-drive state quickly so as to stabilize the running of the vehicle. However, in the technique described in JP 2010-254058 A, the switching to the four-wheel-drive state is not performed until rotations of the coupling sleeve and the clutch gear are synchronized with each other, which may result in that the switching to the four-wheel drive state is not necessarily performed quickly. Even in a case where a pair of rotational members rotates relative to each other, such an electromagnetic clutch device has been demanded that is able to couple the pair of rotational members to each other immediately.

In view of this, the present invention provides an electromagnetic clutch device that is able to achieve a large torque transmission capacity and to improve responsiveness of switching between a coupled state and an uncoupled state of a first rotational member and a second rotational member that are rotatable relative to each other Further, the present invention provides an electromagnetic clutch device that is able to improve responsiveness of switching from an uncoupled state to a coupled state of a first rotational member and a second rotational member that are rotatable relative to each other.

An electromagnetic clutch device according to a first aspect of the present invention is an electromagnetic clutch device configured to connect a first rotational member to a second rotational member in a torque transmittable manner, and includes: a meshing member including a second meshing portion to be meshed with a first meshing portion formed in the first rotational member, the meshing member being connected to the second rotational member in an axially movable but relatively non-rotatable manner; an electromagnetic coil that cause a magnetic force by current application; an armature that axially move due to the magnetic force; a cylindrical cam member that axially move the meshing member so that the second meshing portion is meshed with the first meshing portion; and a locking portion provided so as to be axially immovable relative to the first rotational member and to be non-rotatable relative to the armature. The cam member is provided with a plurality of locked portions to be locked by the locking portion at different axial positions, such that the plurality of locked portions is formed adjacent to each other in a circumferential direction; the cam member rotates only by a first predetermined angle due to an axial movement of the armature from a first position to a second position, and the cam member further rotates only by a second predetermined angle due to a movement of the armature from the second position to the first position; and when locking of the locking portion is shifted from one of the plurality of locked portions to another locked portion circumferentially adjacent thereto so that the locking portion locks the another locked portion at a different axial position, the second meshing portion is meshed with the first meshing portion.

According to the above aspect, it is possible to improve responsiveness of switching between a coupled state and an uncoupled state of the first rotational member and the second rotational member that are rotatable relative to each other.

An electromagnetic clutch device according to a second aspect of the present invention is an electromagnetic clutch device configured to connect a first rotational member to a second rotational member in a torque transmittable manner, and includes: a meshing member including a second meshing portion to be meshed with a first meshing portion provided in the second rotational member, the meshing member being connected to the first rotational member in an axially movable but relatively non-rotatable manner; an electromagnetic coil that cause a magnetic force by current application; an armature that axially move due to the magnetic force; a biasing member that bias the meshing member in a direction where the second meshing portion is meshed with the first meshing portion; and a pressing mechanism including a locking portion that press the meshing member against a biasing force of the biasing member due to an axial movement of the armature so as to axially move the meshing member, the locking portion being provided so as to be axially immovable and relatively non-rotatable relative to a housing that support the electromagnetic coil, and a cylindrical cam member provided with a plurality of locked portions to be locked by the locking portion at different axial positions, the pressing mechanism being configured such that, in response to an axial movement of the armature, locking of the locking portion is shifted from one of the plurality of locked portions to another locked portion placed at a different axial position. When the cam member moves to an opposite side to the meshing member in response to the axial movement of the armature, the second meshing portion is meshed with the first meshing portion due to the biasing force of the biasing member.

According to the above aspect, it is possible to improve responsiveness of switching from an uncoupled state to a coupled state of the first rotational member and the second rotational member that are rotatable relative to each other.

BRIEF DESCRIPTION OF THE DRAWINGS

Features, advantages, and technical and industrial significance of exemplary embodiments of the invention will be described below with reference to the accompanying drawings, in which like numerals denote like elements, and wherein:

FIG. 21A is a plane view and a sectional view of a first rotational member according to the fourth embodiment;

FIG. 21B is a plane view and a sectional view of the first rotational member according to the fourth embodiment;

FIG. 21C is a plane view and a sectional view of the first rotational member according to the fourth embodiment;

DETAILED DESCRIPTION OF EMBODIMENTS

Figure 1:
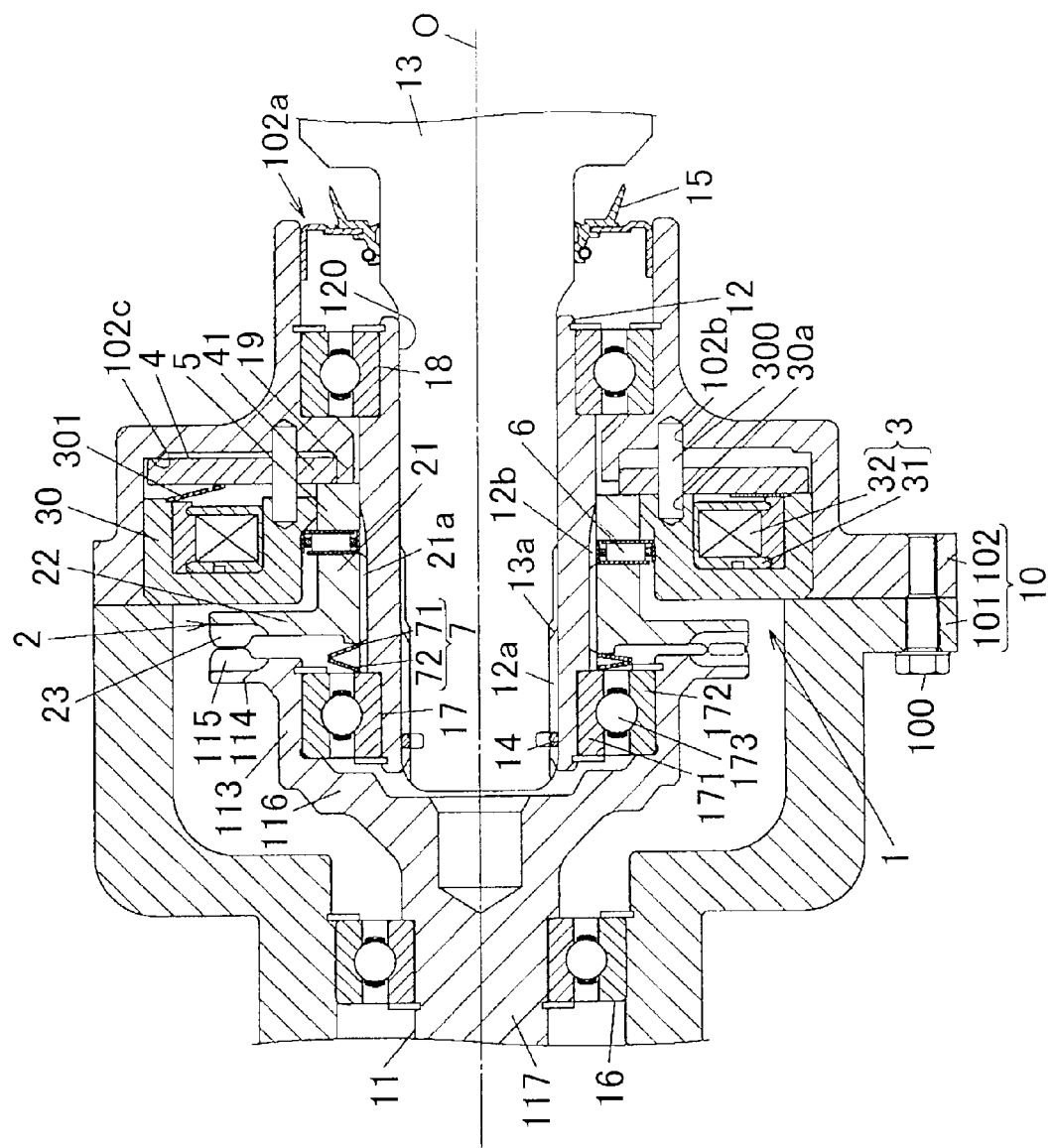
FIG. 1 is a sectional view of an electromagnetic clutch device according to a first embodiment of the present invention.

FIG. 1 is a sectional view of an electromagnetic clutch device according to a first embodiment of the present invention and its vicinal area. The electromagnetic clutch device is used to intermittently transmit a driving force of a driving source such as an engine of a vehicle, for example.

An electromagnetic clutch device 1 connects a first rotational member 11 to a second rotational member 12 in a torque transmittable manner. The first rotational member 11 and the second rotational member 12 have a common rotation axis O so as to be coaxially supported by a housing 10 in a relatively rotatable manner. The housing 10 is constituted by a first housing member 101 and a second housing member 102, and the first housing member 101 and the second housing member 102 are fixed to each other via a plurality of bolts 100 (only one bolt 100 is illustrated in FIG. 1).

The first rotational member 11 is rotatably supported by a ball bearing 16 placed between the first rotational member 11 and the first housing member 101. The first rotational member 11 integrally includes a shaft portion 117 supported by the ball bearing 16, an overhanging portion 116 formed to overhang radially outwardly from an end of the shaft portion 117, a cylindrical portion 113 extending from an outer end of the overhanging portion 116 toward the second rotational member 12 along the rotation axis O, and a gear flange portion 114 formed to overhang further radially outwardly from a tip end of the cylindrical portion 113 and serving as a first meshing portion. A plurality of gear teeth 115 is formed in the gear flange portion 114 along a circumferential direction thereof.

The second rotational member 12 is formed in a cylindrical shape having an insertion hole 120 formed so that a shaft 13 inserted from an opening 102a formed in the second housing member 102 passes therethrough, and an inner peripheral spline portion 12a splined to an outer peripheral spline portion 13a of the shaft 13 is formed on an inner surface of the insertion hole 120. The second rotational member 12 and the shaft 13 are not rotatable relative to each other due to the splining between the inner peripheral spline portion 12a and the outer peripheral spline portion 13a, and an axial relative movement thereof is regulated by a snap ring 14. A sealing member 15 is provided so as to seal between an outer peripheral surface of the shaft 13 and an inner surface of the opening 102a of the second housing member 102.

One axial end of the second rotational member 12 is supported by a ball bearing 17 placed on an inner side of the cylindrical portion 113 of the first rotational member 11, and the other axial end thereof is supported by a ball bearing 18 placed between the second rotational member 12 and the second housing member 102. The ball bearings 17, 18 are fitted to an outer peripheral surface of the second rotational member 12, and an outer peripheral spline portion 12b is formed on the outer peripheral surface of the second rotational member 12 between the ball bearing 17 and the ball bearing 18 so as to be parallel to the rotation axis O. The electromagnetic clutch device 1 is placed between the outer peripheral surface of the second rotational member 12 and the housing 10.

The electromagnetic clutch device 1 includes: a meshing member 2 connected to the second rotational member 12 so as to be axially movable but relatively non-rotatable relative to the second rotational member 12; an electromagnetic coil 3 for generating a magnetic force by current application; an armature 4 to be axially moved by the magnetic force of the electromagnetic coil 3; a cylindrical cam member 5 outwardly engaged to the second rotational member 12; a plurality of locking portions 19 provided so as to be axially immovable relative to the first rotational member 11 and non-rotatable relative to the armature 4; a rolling bearing 6 placed between the meshing member 2 and the cam member 5; an elastic member 7 that elastically press the meshing member 2 toward the cam member 5; and a coned disc spring 301 as a biasing member that bias the armature 4 toward an opposite side to the electromagnetic coil 3.

The cam member 5 is placed between the rolling bearing 6, and the armature 4 and the plurality of locking portions 19 so as to receive a pressing force of the elastic member 7 as an axial biasing force toward the plurality of locking portions 19 from the meshing member 2 via the rolling bearing 6. The locking portions 19 are formed as projections projecting closer to the cam member 5 than that facing surface of the second housing member 102 which is axially opposed to the armature 4. In the present embodiment, the plurality of locking portions 19 is formed integrally with the second housing member 102, but the plurality of locking portions 19 may be formed separately from the second housing member 102.

Further, in the present embodiment, the rolling bearing 6 is constituted by a needle thrust roller bearing. The elastic member 7 is configured by placing a pair of coned disc springs 71, 72 to face each other, and is placed on a first-rotational-member-11 side of the meshing member 2. The coned disc spring 71 makes contact with an axial end surface of the meshing member 2, and the coned disc spring 72 makes contact with an axial end surface of an inner ring 171 of the ball bearing 17 constituted by the inner ring 171, an outer ring 172, and a plurality of spherical rolling elements 173.

The meshing member 2 integrally includes: a cylindrical portion 21 having an inner peripheral spline portion 21a splined to the outer peripheral spline portion 12b of the second rotational member 12; and a gear flange portion 22 formed to overhang radially outwardly from a first-rotational-member-11-side end of the cylindrical portion 21 and serving as a second meshing portion. The meshing member 2 is connected to the second rotational member 12 so as to be axially movable but relatively non-rotatable relative to the second rotational member 12, and when the meshing member 2 moves toward the first rotational member 11, the gear flange portion 22 is meshed with the gear flange portion 114 of the first rotational member 11.

A plurality of gear teeth 23 is formed in the gear flange portion 22 along a circumferential direction thereof, and the plurality of gear teeth 23 is meshed with the plurality of gear teeth 115 of the gear flange portion 114. An upper side relative to the rotation axis O in FIG. 1 illustrates a state (uncoupled state) where the gear flange portion 22 of the meshing member 2 is not meshed with the gear flange portion 114 of the first rotational member 11. A lower side relative to the rotation axis O in FIG. 1 illustrates a state (coupled state) where the gear flange portion 22 of the meshing member 2 is meshed with the gear flange portion 114 of the first rotational member 11.

In response to an axial movement of the armature 4, the cam member 5 presses the meshing member 2 axially along the rotation axis O so that the gear flange portion 22 of the meshing member 2 is meshed with the gear flange portion 114 of the first rotational member 11. Details of a pressing mechanism in which the cam member 5 presses the meshing member 2 will be described later.

The electromagnetic coil 3 is formed by winding, around a bobbin 31 made from resin, a winding 32 through which a current supplied from a controller (not shown) flows. The electromagnetic coil 3 is held by an annular yoke 30 made from a ferromagnetic material such as iron, and the yoke 30 is supported by the second housing member 102. The yoke 30 has a plurality of holes 30a to which columnar pins 300 placed in parallel with the rotation axis O are fitted, and one ends of the pins 300 are inserted into the holes 30a. Further, the second housing member 102 has a plurality of holes 102b to which the other ends of the pins 300 are fitted.

Figure 2:
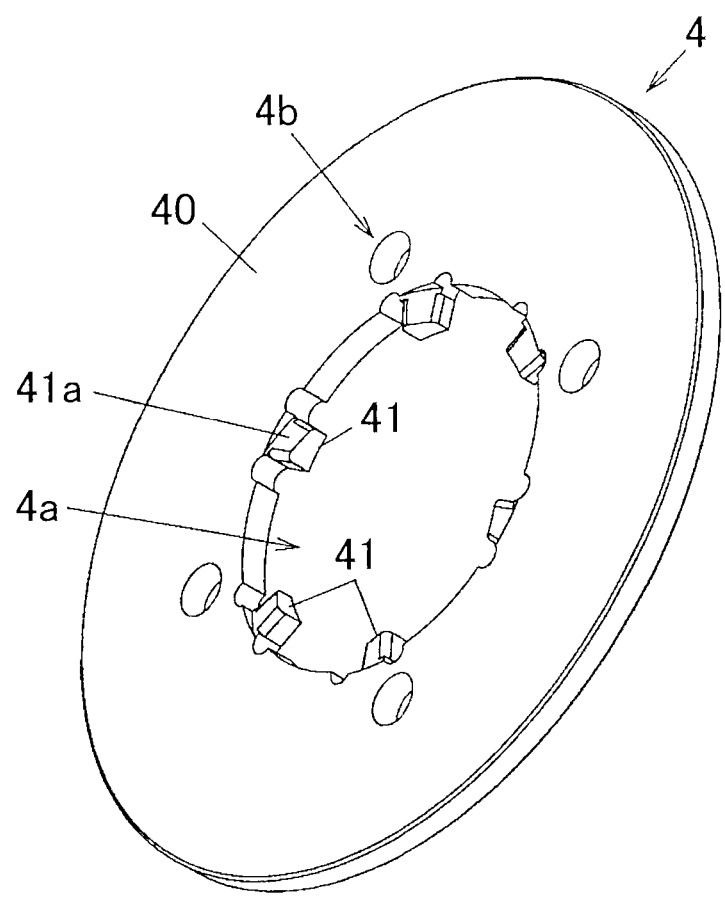
FIG. 2 is a perspective view illustrating an armature.

FIG. 2 is a perspective view illustrating the armature 4. The armature 4 integrally includes: an annular-disk shaped main body 40 having, in its center, a through hole 4a through which the second rotational member 12 passes; and a plurality of (six in the present embodiment) pressing projections 41 projecting from an inner peripheral surface of the through hole 4a toward the center of the main body 40. In the main body 40, pin insertion holes 4b through which a plurality of pins 300 (illustrated in FIG. 1) passes are formed at several places (four places in the present embodiment)

around the through hole 4a. That facing surface 41a of the pressing projection 41 which is opposed to axial end surfaces 51a, 52a of first and second locked portions 51, 52 of the cam member 5 (described later) is formed as an inclined surface that is inclined with respect to a thickness direction (a direction parallel to the rotation axis O) of the main body 40.

As illustrated in FIG. 1, the armature 4 is elastically pressed, in a direction to be distanced from the yoke 30, by the coned disc spring 301 placed between the main body 40 and the yoke 30. When no current is applied to the electromagnetic coil 3, the armature 4 abuts with a receiving portion 102c of the second housing member 102 due to a pressing force of the coned disc spring 301, and when a current is applied to the electromagnetic coil 3, the armature 4 is drawn to the yoke 30 by a magnetic force thereof.

Further, a rotation of the armature 4 relative to the second housing member 102 and the yoke 30 is regulated by the plurality of pins 300 passing through the pin insertion holes 4b, so that the armature 4 is axially movable but relatively non-rotatable relative to the electromagnetic coil 3. The armature 4 is guided by the plurality of pins 300 so as to axially move between a first position in which the armature 4 abuts with the receiving portion 102c of the second housing member 102 and a second position in which the armature 4 abuts with the yoke 30. The coned disc spring 301 biases the armature 4 from the second position toward the first position. The upper side relative to the rotation axis O in FIG. 1 illustrates a state where the armature 4 is placed in the first position, and the lower side relative to the rotation axis O in FIG. 1 illustrates a state where the armature 4 is placed in the second position.

Figure 3:
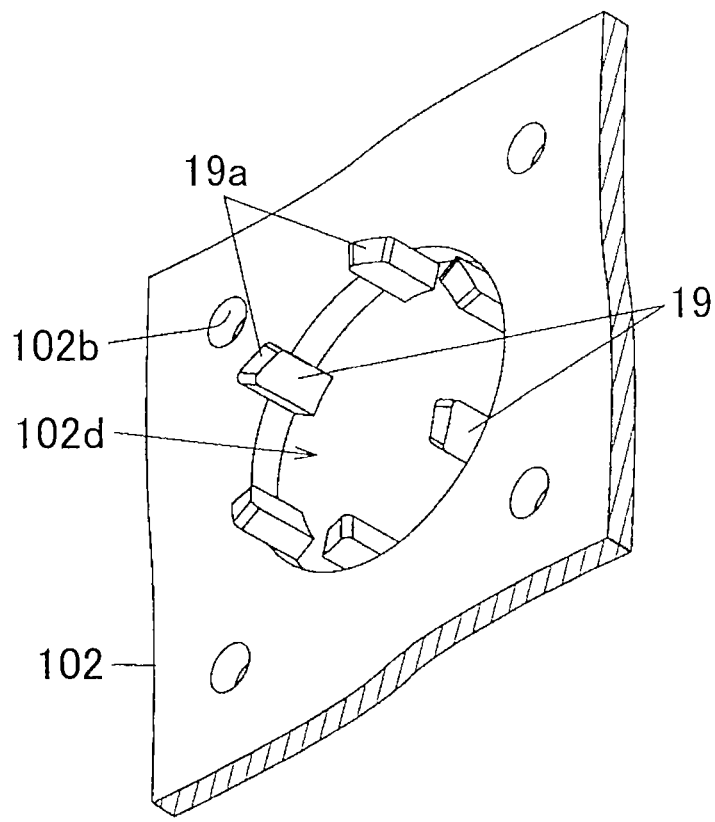
FIG. 3 is a perspective view illustrating a plurality of locking portions provided in a second housing member.

FIG. 3 is a perspective view illustrating the plurality of locking portions 19 provided in the second housing member 102 and its vicinal area.

The second housing member 102 has a through hole 102d through which the second rotational member 12 passes, and the plurality of locking portions 19 projects from an inner peripheral surface of the through hole 102d toward the second rotational member 12, and also projects toward the cam member 5 along the rotation axis O. The plurality of locking portions 19 is provided at regular intervals along a circumferential direction of the through hole 102d, and the number of the locking portions 19 is the same as the number of the pressing projections 41 of the armature 4. Similarly to the facing surface 41a of the pressing projection 41 of the armature 4, the locking portion 19 is formed such that that tip end surface 19a of the locking portion 19 which is opposed to the axial end surfaces 51a, 52a of the first and second locked portions 51, 52 of the cam member 5 (described later) is formed as an inclined surface that is inclined with respect to the direction parallel to the rotation axis O.

Figure 4A:
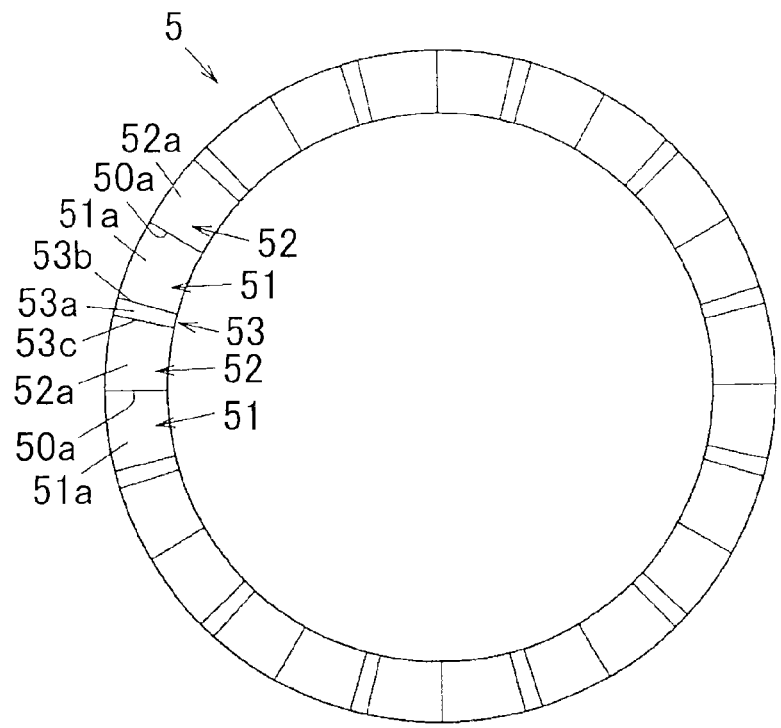
FIG. 4A is a plane view of a cam member.
Figure 4B:
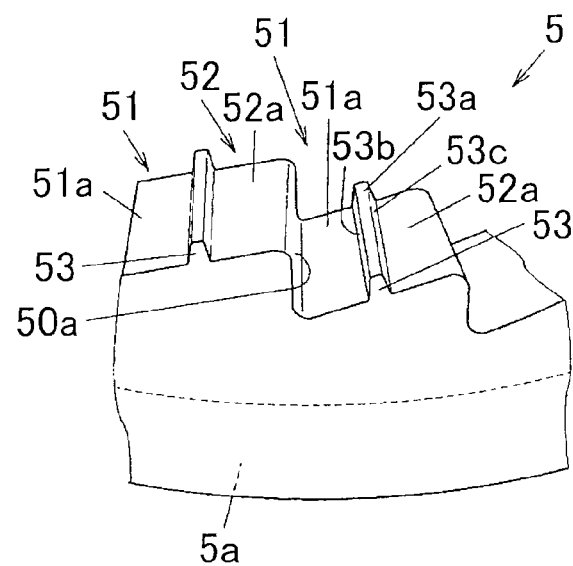
FIG. 4B is a perspective view illustrating part of the cam member.

FIG. 4A is a plane view of the cam member 5 viewed from a side of the plurality of locking portions 19 along the rotation axis O, and FIG. 4B is a perspective view illustrating part of the cam member 5.

In the cam member 5, a plurality of locked portions locked by the locking portion 19 at different axial positions are formed so as to be adjacent to each other in a circumferential direction. In the present embodiment, the plurality of locked portions is constituted by a first locked portion 51 and a second locked portion 52, and the first locked portion 51 and the second locked portion 52 are formed alternately in the circumferential direction. That base end surface 5a of the cam member 5 which makes contact with the rolling bearing 6 is formed as a flat surface perpendicular to the direction parallel to the rotation axis O. The first locked portion 51 is formed in a position closer to the base end surface 5a than the second locked portion 52.

As illustrated in FIG. 4A, twelve first locked portions 51 and twelve second locked portions 52 are formed alternately in the cam member 5 in the circumferential direction. When the cam member 5 is viewed from a direction shown in FIG. 4A, a wall portion 53 axially projecting is formed between the second locked portion 52 and the first locked portion 51 adjacent to the second locked portion 52 in a clockwise direction. The wall portion 53 functions as a partition wall that sections the first locked portion 51 and the second locked portion 52. One end surface out of both end surfaces of the wall portion 53 in the circumferential direction faces the first locked portion 51 as a first wall surface 53b, and the other end surface faces the second locked portion 52 as a second wall surface 53c. An end surface 53a of the wall portion 53 in an axial direction of the cam member 5 is inclined so that a first-wall-surface-53b side thereof is placed closer to the base end surface 5a than a second-wall-surface-53c side thereof.

The axial end surface 51a in an axial end of the first locked portion 51 and the axial end surface 52a in an axial end of the second locked portion 52 are formed so as to be inclined with respect to the circumferential direction of the cam member 5. More specifically, the axial end surface 51a of the first locked portion 51 is a flat surface inclined so that a second-locked-portion-52 side thereof is placed closer to the base end surface 5a than a wall-portion-53 side thereof, and the axial end surface 52a of the second locked portion 52 is a flat surface inclined so that a wall-portion-53 side thereof is placed closer to the base end surface 5a than a first-locked-portion-51 side thereof.

A wall surface 50a in the circumferential direction is formed between that end of the axial end surface 51a of the first locked portion 51 which is opposite to the wall portion 53, and that end of the axial end surface 52a of the second locked portion 52 which is opposite to the wall portion 53. The wall surface 50a is formed as a flat surface parallel to the rotation axis O as a stepped surface between the first locked portion 51 and the second locked portion 52. An angle formed between the axial end surface 51a of the first locked portion 51 and the wall surface 50a is an acute angle.

Further, the axial end surface 52a of the second locked portion 52 is inclined with respect to the circumferential direction of the cam member 5 at the same angle as that of the axial end surface 51a of the first locked portion 51, and an angle formed between the axial end surface 52a and the second wall surface 53c of the wall portion 53 is an acute angle.

The facing surface 41a of the pressing projection 41 of the armature 4 and the tip end surface 19a of the locking portion 19 abut with the axial end surface 51a of the first locked portion 51 and the axial end surface 52a of the second locked portion 52. The facing surface 41a of the armature 4 abuts with outer parts of the axial end surfaces 51a, 52a in a radial direction of the cam member 5, and the tip end surface 19a of the locking portion 19 abuts with inner parts of the axial end surfaces 51a, 52a in the radial direction of the cam member 5. The cam member 5 receives, due to the elastic member 7, an axial biasing force at which the axial end surfaces 51a, 52a are pressed against the pressing projection 41 of the armature 4 and the locking portion 19.

FIGS. 5A to 5E are schematic views to describe an operation at the time when the cam member 5 rotates and moves axially due to an axial movement of the armature 4. The electromagnetic clutch device 1 is configured such that: the cam member 5 rotates only by a first predetermined angle due to a movement of the armature 4 from the first position to the second position; the cam member 5 further rotates only by a second predetermined angle due to a movement of the armature 4 from the second position to the first position; and locking of the locking portion 19 is shifted from one of the plurality of locked portions to another locked portion circumferentially adjacent thereto so that the locking portion 19 locks the another locked portion at a different axial position, and hereby, the plurality of gear teeth 23 of the gear flange portion 22 is meshed with the plurality of gear teeth 115 of the gear flange portion 114. The following describes the electromagnetic clutch device 1 more specifically with reference to FIGS. 5A to 5E.

Figure 5A:
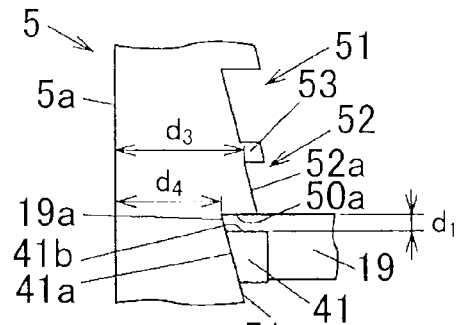
FIG. 5A is a schematic view to describe an operation at the time when the cam member rotates and axially moves due to an axial movement of the armature.

FIG. 5A illustrates a first state where the locking portion 19 locks the first locked portion 51, and the armature 4 is placed in the first position. In the first state, the axial end surface 51a of the first locked portion 51 is pressed against the tip end surface 19a of the locking portion 19 by a biasing force of the elastic member 7, and is also opposed to the facing surface 41a of the pressing projection 41 of the armature 4. Further, the locking portion 19 abuts with the wall surface 50a, and the pressing projection 41 of the armature 4 is opposed to the axial end surface 51a in a position distanced from the wall surface 50a in the circumferential direction of the cam member 5.

Figure 5B:
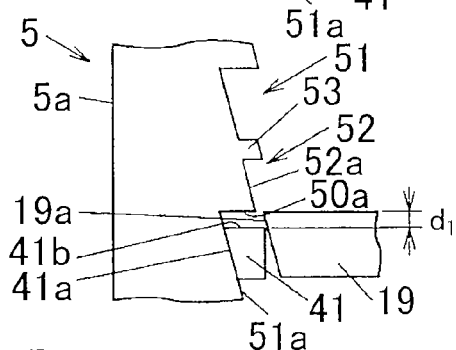
FIG. 5B is a schematic view to describe the operation at the time when the cam member rotates and axially moves due to the axial movement of the armature.

FIG. 5B illustrates a second state where a current is applied to the electromagnetic coil 3, and the armature 4 moves to the second position from the first state illustrated in FIG. 5A. The facing surface 41a of the pressing projection 41 of the armature 4 abuts with the axial end surface 51a in a course of shifting from the first state to the second state, and the pressing projection 41 presses and moves the cam member 5 toward the meshing member 2. Further, in the second state, due to the movement of the cam member 5, a state where the locking portion 19 abuts with the wall surface 50a is released.

Figure 5C:
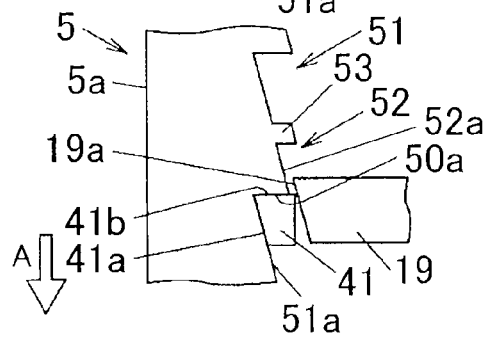
FIG. 5C is a schematic view to describe the operation at the time when the cam member rotates and axially moves due to the axial movement of the armature.

FIG. 5C illustrates a third state where, due to sliding between the axial end surface 51a of the first locked portion 51 and the facing surface 41a of the pressing projection 41 of the armature 4, the cam member 5 rotates in an arrow-A direction only by the first predetermined angle. Due to the rotation of the cam member 5, the wall surface 50a abuts with a side surface 41b (a circumferential end surface of the pressing projection 41) of the pressing projection 41 of the armature 4.

That is, when the armature 4 moves from the first position to the second position in the axial direction, the armature 4 presses the cam member 5 toward the meshing member 2 and rotates the cam member 5 only by the first predetermined angle. The first predetermined angle is an angle corresponding to a distance d1 of a gap between the side surface 41b of the pressing projection 41 of the armature 4 and the wall surface 50a, as illustrated in FIGS. 5A and 5B.

When the armature 4 is placed in the second position, the tip end surface 19a of the locking portion 19 is opposed to the axial end surface 52a of the second locked portion 52 via a gap. That is, when the armature 4 moves to the second position, the cam member 5 rotates by the first predetermined angle and the pressing projection 41 abuts with the wall surface 50a, and the tip end surface 19a of the locking portion 19 is opposed to the axial end surface 52a of the second locked portion 52 adjacent to the first locked portion 51.

Figure 5D:
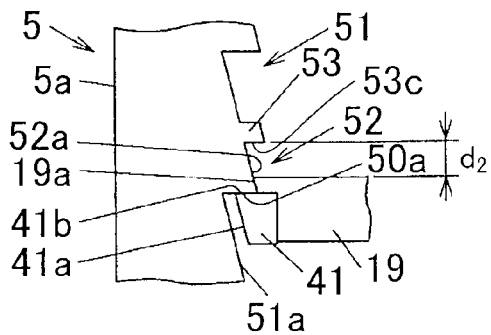
FIG. 5D is a schematic view to describe the operation at the time when the cam member rotates and axially moves due to the axial movement of the armature.

FIG. 5D illustrates a fourth state where current application to the electromagnetic coil 3 is stopped, and the armature 4 is in the middle of returning to the first position from the second position. In the fourth state, the tip end surface 19a of the locking portion 19 abuts with the axial end surface 52a of the second locked portion 52. When the tip end surface 19a of the locking portion 19 abuts with the axial end surface 52a of the second locked portion 52, a rotational force toward the arrow-A direction is applied to the cam member 5, but the rotation of the cam member 5 to the arrow-A direction is regulated by abutment of the side surface 41b of the pressing projection 41 of the armature 4 with respect to the wall surface 50a.

Figure 5E:
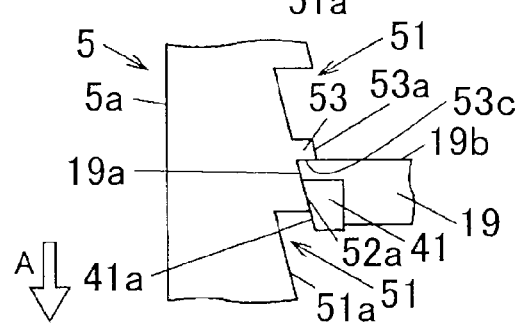
FIG. 5E is a schematic view to describe the operation at the time when the cam member rotates and axially moves due to the axial movement of the armature.

FIG. 5E illustrates a fifth state where the armature 4 returns to the first position, the cam member 5 rotates in the arrow-A direction until the second wall surface 53c of the wall portion 53 abuts with a side surface 19b of the locking portion 19. In the fifth state, due to sliding between the tip end surface 19a of the locking portion 19 and the axial end surface 52a of the second locked portion 52 of the cam member 5 that receives the biasing force of the elastic member 7, the cam member 5 rotates relative to the locking portion 19 by the second predetermined angle. Hereby, the locking portion 19 locks the second locked portion 52. The second predetermined angle is an angle corresponding to a distance d2 between the second wall surface 53c of the wall portion 53 and the locking portion 19 in the third state illustrated in FIG. 5D.

That is, when the armature 4 moves from the second position to the first position, the cam member 5 further rotates only by the second predetermined angle, and hereby, the locking portion 19 locks the second locked portion 52 adjacent to the first locked portion 51. As described above, the first locked portion 51 and the second locked portion 52 are placed in different positions in the axial direction of the cam member 5, and a distance d3 (illustrated in FIG. 5A) from the base end surface 5a to the axial end surface 52a of the second locked portion 52 is longer than a distance d4 (illustrated in FIG. 5A) from the base end surface 5a to the axial end surface 51a of the first locked portion 51. Thus, the cam member 5 axially moves due to the shifting from the first state illustrated in FIG. 5A to the fifth state illustrated in FIG. 5E, and the meshing member 2 is moved so that the gear flange portion 22 is meshed with the gear flange portion 114 of the first rotational member 11. Hereby, the gear flange portion 22 of the meshing member 2 is meshed with the gear flange portion 114 of the first rotational member 11, thereby achieving a coupled state where a torque is transmittable between the first rotational member 11 and the second rotational member 12.

When the armature 4 moves from the first position to the second position and then further returns to the first position after the first rotational member 11 and the second rotational member 12 enter the coupled state, the locking portion 19 locks the first locked portion 51, so that the meshing between the gear flange portion 114 of the first rotational member 11 and the gear flange portion 22 of the meshing member 2 is released, thereby causing the first rotational member 11 and the second rotational member 12 to enter an uncoupled state.

An operation of the armature 4 and the cam member 5 at the time of shifting from the coupled state to the uncoupled state is similar to the operation described with reference to FIG. 5. That is, from the state illustrated in FIG. 5E, the armature 4 axially moves to press the cam member 5 toward the meshing member 2, so that the axial end surface 52a of the second locked portion 52 slides over the facing surface 41a of the pressing projection 41 until the side surface 41b of the pressing projection 41 abuts with the second wall surface 53c of the wall portion 53, and thus, the cam member 5 rotates only by the first predetermined angle. At this time, the tip end surface 19a of the locking portion 19 is opposed to the end surface 53a of the wall portion 53.

When the armature 4 returns to the first position, the end surface 53a of the wall portion 53 and the axial end surface 51a of the first locked portion 51 slide over the tip end surface 19a of the locking portion 19, so that the cam member 5 rotates only by the second predetermined angle, and the locking portion 19 locks the first locked portion 51. The second predetermined angle in this case is an angle corresponding to a distance between the wall surface 50a and the locking portion 19 in a state where the side surface 41b of the pressing projection 41 abuts with the second wall surface 53c of the wall portion 53.

As such, when the armature 4 reciprocates between the first position and the second position, a state where the locking portion 19 locks the first locked portion 51 and a state where the locking portion 19 locks the second locked portion 52 are switched. When the locking portion 19 locks the second locked portion 52, the plurality of gear teeth 23 of the gear flange portion 22 is meshed with the plurality of gear teeth 115 of the gear flange portion 114. When the locking portion 19 locks the first locked portion 51, the meshing between the plurality of gear teeth 23 of the gear flange portion 22 and the plurality of gear teeth 115 of the gear flange portion 114 is released.

Figure 6A:
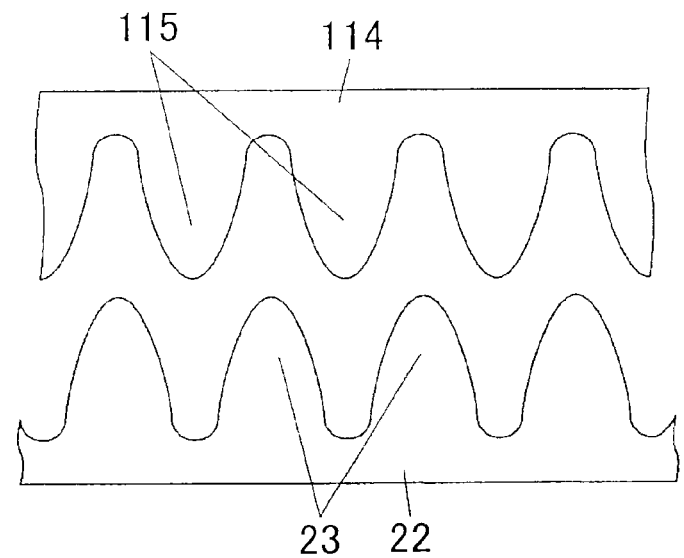
FIG. 6A is a schematic view illustrating an uncoupled state between a plurality of gear teeth of a first rotational member and a plurality of gear teeth of a meshing member.
Figure 6B:
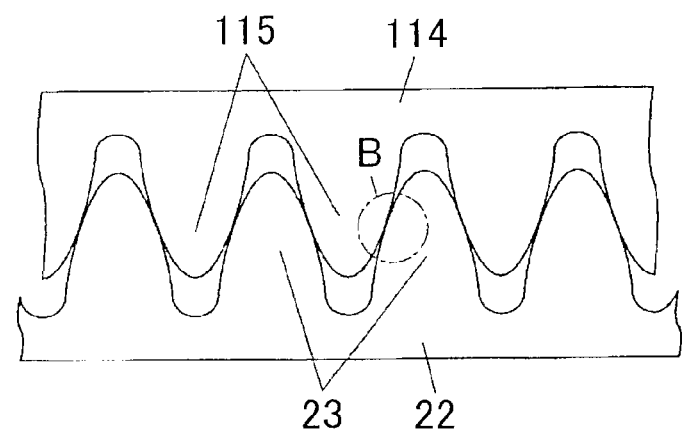
FIG. 6B is a schematic view illustrating a coupled state between the plurality of gear teeth of the first rotational member and the plurality of gear teeth of the meshing member.
Figure 6C:
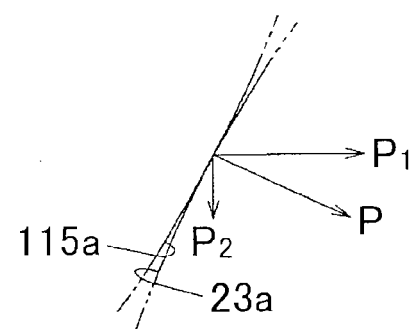
FIG. 6C is a partially enlarged view of a part B in FIG. 6B.

FIGS. 6A to 6C schematically illustrate the plurality of gear teeth 115 of the gear flange portion 114 of the first rotational member 11 and the plurality of gear teeth 23 of the gear flange portion 22 of the meshing member 2. FIG. 6A is a schematic view illustrating the uncoupled state, FIG. 6B is a schematic view illustrating the coupled state, and FIG. 6C is an enlarged view of a part B in FIG. 6B.

In the uncoupled state illustrated in FIG. 6A, the plurality of gear teeth 115 of the first rotational member 11 is not meshed with the plurality of gear teeth 23 of the meshing member 2, so that the first rotational member 11 and the second rotational member 12 are rotatable relative to each other.

When the meshing member 2 is pressed by the cam member 5 and moves toward the first rotational member 11, the plurality of gear teeth 23 of the meshing member 2 comes inside between the plurality of gear teeth 115 of the first rotational member 11 as illustrated in FIG. 6B, so that the gear teeth 115 are meshed with the gear teeth 23 so that they are in the coupled state.

In the coupled state, when a torque is transmitted from the first rotational member 11 to the second rotational member 12, tooth flanks 23a of the gear teeth 23 of the meshing member 2 receive a pressure P from tooth flanks 115a of the gear teeth 115 of the first rotational member 11 due to the torque, as illustrated in FIG. 6C. Due to the pressure P, a circumferential component force P1 and an axial component force P2 are applied to the meshing member 2.

The circumferential component force P1 becomes a torque to be transmitted to the second rotational member 12 via the meshing member 2, and the axial component force P2 is transmitted to the cam member 5 via the rolling bearing 6. Hereby, the cam member 5 is pressed toward the locking portion 19. However, the axial end surface 52a of the second locked portion 52 of the cam member 5 abuts with the tip end surface 19a of the locking portion 19, so that an axial movement of the cam member 5 is regulated. That is, the locking portion 19 receives the axial component force P2 via the meshing member 2, the rolling bearing 6, and the cam member 5, thereby regulating the axial movement of the cam member 5.

According to the first embodiment described above, it is possible to obtain the following operation/working-effect.

The meshing member 2 moves axially along with the axial movement of the armature 4 from the first position to the second position so as to be meshed with the first rotational member 11. Accordingly, in comparison with a case where an electric motor and a speed reducer are used as an actuator for operating a clutch device, it is possible to perform switching between the coupled state and the uncoupled state immediately. That is, responsiveness of switching improves.

The axial component force P2 that the meshing member 2 receives due to torque transmission between the first rotational member 11 and the second rotational member 12 is received by the locking portion 19 via the cam member 5. This attains a large torque transmission capacity, thereby making it possible to transmit a large torque such as a driving force of the vehicle, for example.

The cam member 5 is configured such that the axial end surface 51a of the first locked portion 51 and the axial end surface 52a of the second locked portion 52 are inclined with respect to the circumferential direction, so that the axial end surfaces 51a, 52a slide over the facing surface 41a of the pressing projection 41 due to the axial movement of the armature 4 from the first position to the second position, and thus, the cam member 5 rotates only by the first predetermined angle. Further, the cam member 5 is configured such that the axial end surface 51a of the first locked portion 51, the axial end surface 52a of the second locked portion 52, and the end surface 53a of the wall portion 53 are inclined with respect to the circumferential direction, so that the axial end surface 51a of the first locked portion 51, the axial end surface 52a of the second locked portion 52, and the end surface 53a of the wall portion 53 slide over the tip end surface 19a of the locking portion 19 due to the axial movement of the armature 4 from the second position to the first position, and thus, the cam member 5 rotates only by the second predetermined angle. That is, since the cam member 5 rotates due to the axial movement of the armature 4, it is possible to perform switching between a state where the locking portion 19 locks the first locked portion 51 and a state where the locking portion 19 locks the second locked portion 52, without a rotational drive mechanism such as a motor for rotating the cam member 5. This makes it possible to downsize the electromagnetic clutch device 1 and to reduce cost thereof.

The elastic member 7 is placed on the first-rotational-member-11 side of the meshing member 2, and a biasing force thereof acts so as to distance the meshing member 2 from the first rotational member 11 and to press, via the rolling bearing 6, the cam member 5 toward the locking portion 19 and the pressing projection 41 of the armature 4. Hereby, the meshing between the gear flange portion 114 of the first rotational member 11 and the gear flange portion 22 of the meshing member 2 is released immediately at the time when the locking portion 19 locks the first locked portion 51. Further, sliding of the axial end surface 51a of the first locked portion 51, the axial end surface 52a of the second locked portion 52, and the end surface 53a of the wall portion 53 with respect to the facing surface 41a of the pressing projection 41 and the tip end surface 19a of the locking portion 19 allows the cam member 5 to rotate.

In a state where the locking portion 19 locks the second locked portion 52 of the cam member 5 and current application to the electromagnetic coil 3 is stopped, the meshing member 2 is meshed with the first rotational member 11. Accordingly, it is not necessary to continue the current application to the electromagnetic coil 3 in the coupled state. This makes it possible to reduce power consumption and heat generation at the time of the operation of the electromagnetic clutch device 1.

Next will be described a second embodiment of the present invention with reference to FIGS. 7 to 10.

Figure 7:
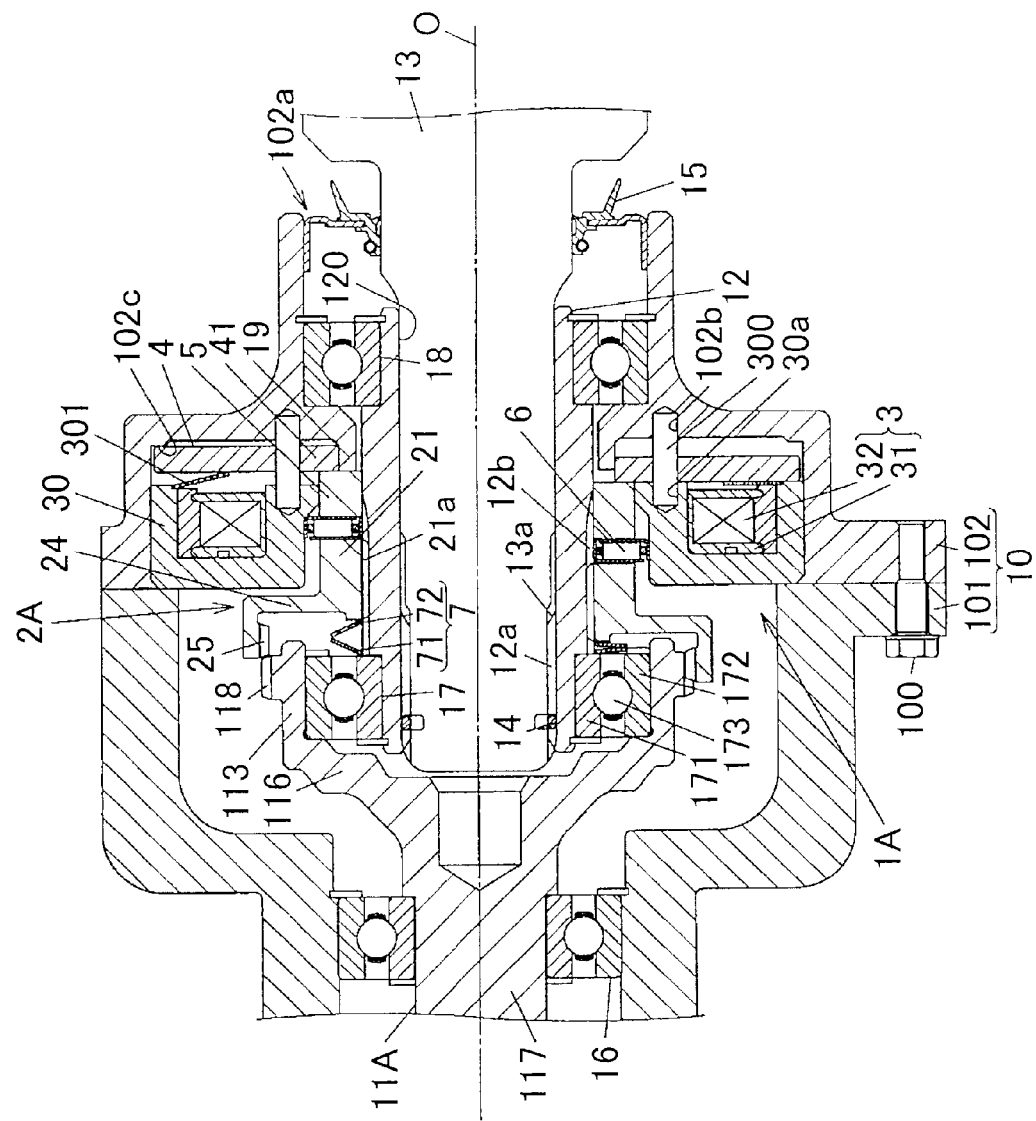
FIG. 7 is a sectional view of an electromagnetic clutch device according to a second embodiment.

FIG. 7 is a sectional view of an electromagnetic clutch device 1A according to the present embodiment. In FIG. 7, a constituent having substantially the same function as a constituent of the electromagnetic clutch device 1 described in the first embodiment has the same reference sign as in the electromagnetic clutch device 1, and a redundant description thereof is omitted.

Configurations of a first rotational member 11A, a meshing member 2A, and a cam member 5 of the electromagnetic clutch device 1A according to the present embodiment are different from the configurations of the first rotational member 11, the meshing member 2, and the cam member 5 of the electromagnetic clutch device 1 according to the first embodiment.

The first rotational member 11A integrally includes a shaft portion 117, an overhanging portion 116, a cylindrical portion 113 extending from an outer end of the overhanging portion 116 toward a second rotational member 12 along a rotation axis O, and a spline portion 118 serving as a first meshing portion provided on an outer periphery of the cylindrical portion 113. A plurality of spline grooves is formed in the spline portion 118 so as to be parallel to the rotation axis O.

The meshing member 2A integrally includes: a cylindrical portion 21; a flange portion 24 formed to overhang radially outwardly from a first-rotational-member-11A-side end of the cylindrical portion 21; and a cylindrical spline portion 25 extending from an outer peripheral end of the flange portion 24 toward the first rotational member 11A. A plurality of spline grooves is formed on an inner surface of the spline portion 25 so as to be parallel to the rotation axis O.

The spline portion 25 of the meshing member 2A is formed to have a diameter larger than the spline portion 118 of the first rotational member 11A. When the meshing member 2A moves axially toward the first rotational member 11A, the spline portion 25 of the meshing member 2A is meshed with the spline portion 118 of the first rotational member 11A, and hereby, the first rotational member 11A is connected to the second rotational member 12 in a torque transmittable manner.

Figure 8:
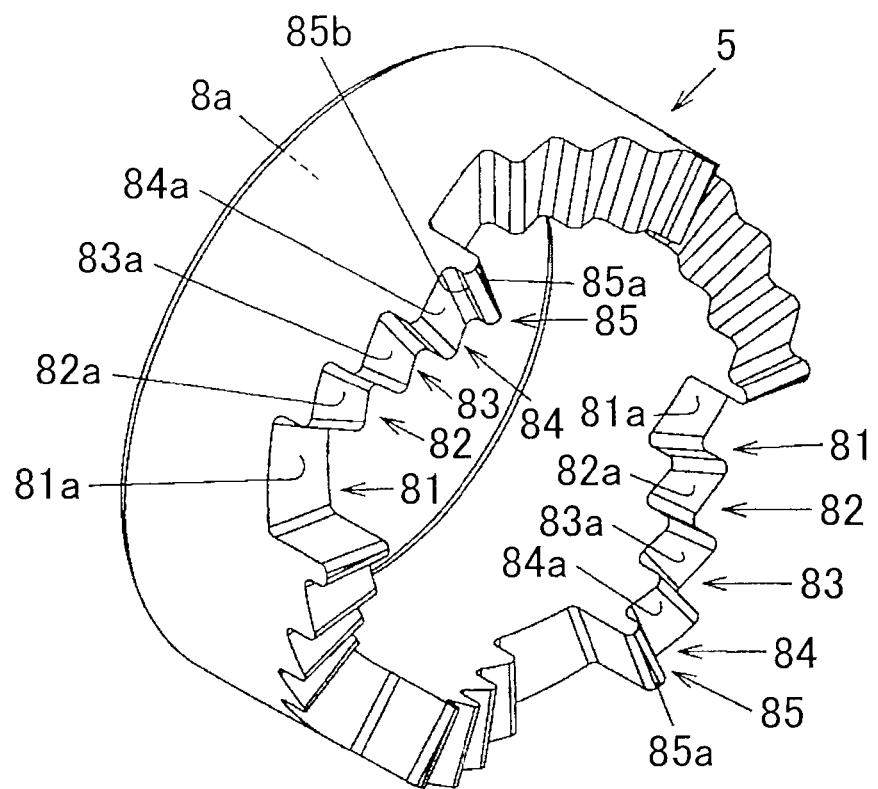
FIG. 8 is a perspective view illustrating a cam member according to the second embodiment.

FIG. 8 is a perspective view illustrating the cam member 5 according to the present embodiment. In that end of the cam member 5 which is on a side opposite to a base end surface 8a thereof with which a rolling bearing 6 abuts, six sets of first to fourth locked portions 81 to 84 to be locked by locking portions 19 are formed. When the cam member 5 is viewed clockwise from a direction of the rotation axis O, the first to fourth locked portions 81 to 84 in each set is configured such that the second locked portion 82 is formed adjacent to the first locked portion 81, the third locked portion 83 is formed adjacent to the second locked portion 82, and the fourth locked portion 84 is formed adjacent to the third locked portion 83. A wall portion 85 projecting axially is formed in that end of the fourth locked portion 84 which is opposite to the third locked portion 83.

The first to fourth locked portions 81 to 84 are placed at different positions in an axial direction of the cam member 5, and the second locked portion 82 is farther from the base end surface 8a than the first locked portion 81, the third locked portion 83 is farther from the base end surface 8a than the second locked portion 82, and the fourth locked portion 84 is farther from the base end surface 8a than the third locked portion 83.

Respective axial end surfaces 81a to 84a of the first to fourth locked portions 81 to 84 are inclined with respect to a circumferential direction of the cam member 5. More specifically, the axial end surface 81a of the first locked portion 81 is inclined such that an end thereof on a second-locked portion-82 side is closer to the base end surface 8a, the axial end surface 82a of the second locked portion 82 is inclined such that an end thereof on a third-locked portion-83 side is closer to the base end surface 8a, the axial end surface 83a of the third locked portion 83 is inclined such that an end thereof on a fourth-locked portion-84 side is closer to the base end surface 8a, and the axial end surface 84a of the fourth locked portion 84 is inclined such that an end thereof on a wall-portion-85 side is closer to the base end surface 8a.

An axial end surface 85a of the wall portion 85 is inclined in the same direction as the axial end surfaces 81a to 84a. Further, one wall surface 85b of the wall portion 85 in its circumferential direction faces the fourth locked portion 84.

FIGS. 9A to 9D are operation explanatory views each illustrating the cam member 5 according to the present embodiment and the armature 4 as well as the locking portions 19. Note that, in FIGS. 9A to 9D, a second housing member 102 is omitted except for the plurality of locking portions 19.

Figures 9A, 9B:
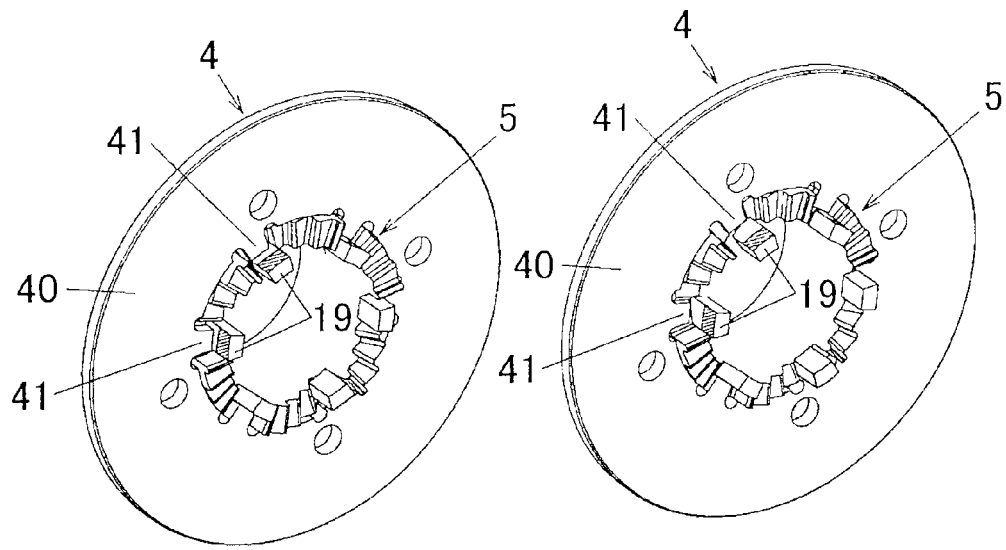
FIG. 9A is an operation explanatory view illustrating the cam member according to the second embodiment and an armature as well as a locking portion.
FIG. 9B is an operation explanatory view illustrating the cam member according to the second embodiment and the armature as well as the locking portion.
Figures 9C, 9D:
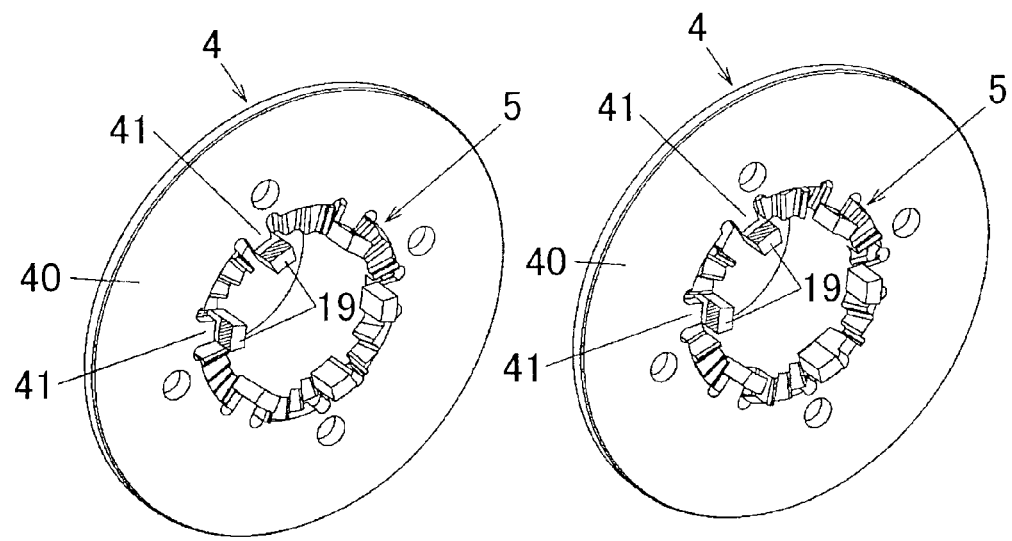
FIG. 9C is an operation explanatory view illustrating the cam member according to the second embodiment and the armature as well as the locking portion.
FIG. 9D is an operation explanatory view illustrating the cam member according to the second embodiment and the armature as well as the locking portion.

An operation of the cam member 5 and the armature 4 at the time when a state where the locking portion 19 locks the first locked portion 81 is shifted to a state where the locking portion 19 locks the second locked portion 82 is the same as the operation described in the first embodiment with reference to FIG. 5A and FIGS. 5C to 5E. That is, FIG. 9A illustrates a first state where the locking portion 19 locks the first locked portion 81, and FIG. 9B illustrates a third state where the armature 4 moves from a first position to a second position. Further, FIG. 9C illustrates a fourth state where the armature 4 is in the middle of returning to the first position from the second position, and FIG. 9D illustrates a fifth state where the locking portion 19 locks the second locked portion 82.

In the present embodiment, since the cam member 5 includes four locked portions (the first to fourth locked portions 81 to 84) placed at different axial positions, current application to an electromagnetic coil 3 and stop of the current application thereto are performed three times. Hereby, the armature 4 reciprocates three times between the first position and the second position, so that the cam member 5 rotates from a position where the locking portion 19 locks the first locked portion 81 to a position where the locking portion 19 locks the fourth locked portion 84.

In a state where the locking portion 19 locks the first locked portion 81 and the spline portion 25 of the meshing member 2A is not meshed with the spline portion 118 of the first rotational member 11A, so that the electromagnetic clutch device 1A is in an uncoupled state. Further, in a state where the locking portion 19 locks the fourth locked portion 84, the spline portion 25 of the meshing member 2A is meshed with the spline portion 118 of the first rotational member 11A, so that the electromagnetic clutch device 1A is in a coupled state. A state where the locking portion 19 locks the second locked portion 82 and a state where the locking portion 19 locks the third locked portion 83 are an incompletely meshed state where part of an axial tip side of the spline portion 25 of the meshing member 2A is splined to the spline portion 118 of the first rotational member 11A.

That is, in the present embodiment, when the armature 4 repeats a movement from the first position to the second position several times, the spline portion 25 of the meshing member 2A is meshed with the spline portion 118 of the first rotational member 11A.

FIG. 10 is a schematic view to describe an operation at the time when a state where the locking portion 19 locks the fourth locked portion 84 is shifted to a state where the locking portion 19 locks the first locked portion 81, and the electromagnetic clutch device 1A switches over from the coupled state to the uncoupled state.

Figures 10A, 10B, 10C:
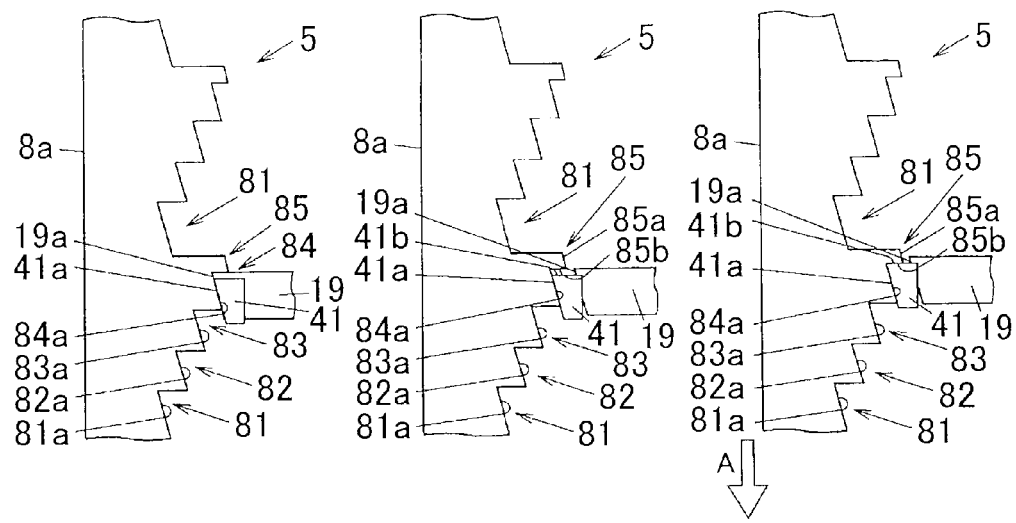
FIG. 10A is a schematic view to describe an operation at the time when the cam member rotates and axially moves in an axial direction due to an axial movement of the armature according to the second embodiment.
FIG. 10B is a schematic view to describe the operation at the time when the cam member rotates and axially moves due to the axial movement of the armature according to the second embodiment.
FIG. 10C is a schematic view to describe the operation at the time when the cam member rotates and axially moves due to the axial movement of the armature according to the second embodiment.

FIG. 10A illustrates a state where the locking portion 19 locks the fourth locked portion 84, and the armature 4 is placed in a first position. In this state, the locking portion 19 abuts with the axial end surface 84a of the fourth locked portion 84 and the circumferential wall surface 85b of the wall portion 85.

FIG. 10B illustrates a state where the armature 4 moves to a second position. In a course of a movement of the armature 4 from the first position to the second position, a pressing projection 41 thereof presses and moves the cam member 5 toward the meshing member 2A. Due to the movement of the cam member 5, a state where the locking portion 19 abuts with the circumferential wall surface 85b of the wall portion 85 is released.

FIG. 10C illustrates a state where, due to sliding between the axial end surface 84a of the fourth locked portion 84 and a facing surface 41a of the pressing projection 41 of the armature 4, the cam member 5 rotates in an arrow-A direction only by a first predetermined angle. Due to the rotation of the cam member 5, the circumferential wall surface 85b of the wall portion 85 abuts with a side surface 41b of the pressing projection 41 of the armature 4.

Figures 10D, 10E:
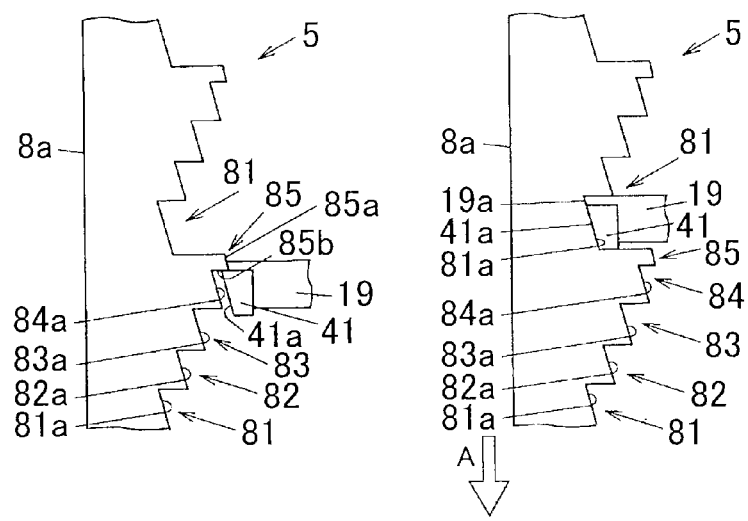
FIG. 10D is a schematic view to describe the operation at the time when the cam member rotates and axially moves due to the axial movement of the armature according to the second embodiment.
FIG. 10E is a schematic view to describe the operation at the time when the cam member rotates and axially moves due to the axial movement of the armature according to the second embodiment.

FIG. 10D illustrates a state where the armature 4 is in the middle of returning to the first position from the second position. In this state, a tip end surface 19a of the locking portion 19 abuts with the axial end surface 85a of the wall portion 85, and a rotational force toward the arrow-A direction is applied to the cam member 5.

FIG. 10E illustrates a state where the armature 4 returns to the first position and the cam member 5 rotates in the arrow-A direction until the locking portion 19 locks the first locked portion 81. In a course of shifting from the state illustrated in FIG. 10C to the state illustrated in FIG. 10D, the cam member 5 is largely displaced in the axial direction, so that meshing between the spline portion 25 of the meshing member 2A and the spline portion 118 of the first rotational member 11A is released.

According to the present embodiment, in addition to the operation/working-effect described in the first embodiment, it is possible to obtain the following effect. That is, by repeating several times the axial movement of the armature 4, the meshing member 2A moves at stages in a direction where the meshing member 2A is meshed with the first rotational member 11A. Accordingly, even in a case where the meshing member 2A moves by a distance longer than a moving distance of the armature 4 (an axial moving distance between the first position and the second position) so as to switch between the uncoupled state and the coupled state, it is possible to mesh the meshing member 2A with the first rotational member 11A. Hereby, it is possible to increase a meshing length between the spline portion 25 of the meshing member 2A and the spline portion 118 of the first rotational member 11A, thereby making it possible to obtain a large torque transmission capacity.

Note that the present embodiment deals with a case where the cam member 5 includes four locked portions (the first to fourth locked portions 81 to 84) placed at different axial positions. However, if a plurality of locked portions is formed in at least three different axial positions, it is possible to obtain the operation/working-effect of the present embodiment.

The electromagnetic clutch devices 1, 1A of the present invention have been described above based on the first and second embodiments. However, the present invention is not limited to these embodiments, but is performable in various modifications within a range which does not deviate from the gist of the present invention. For example, it is also possible to use the electromagnetic clutch devices 1, 1A for purposes except for a purpose of transmitting a driving force of a vehicle.

Figure 11:
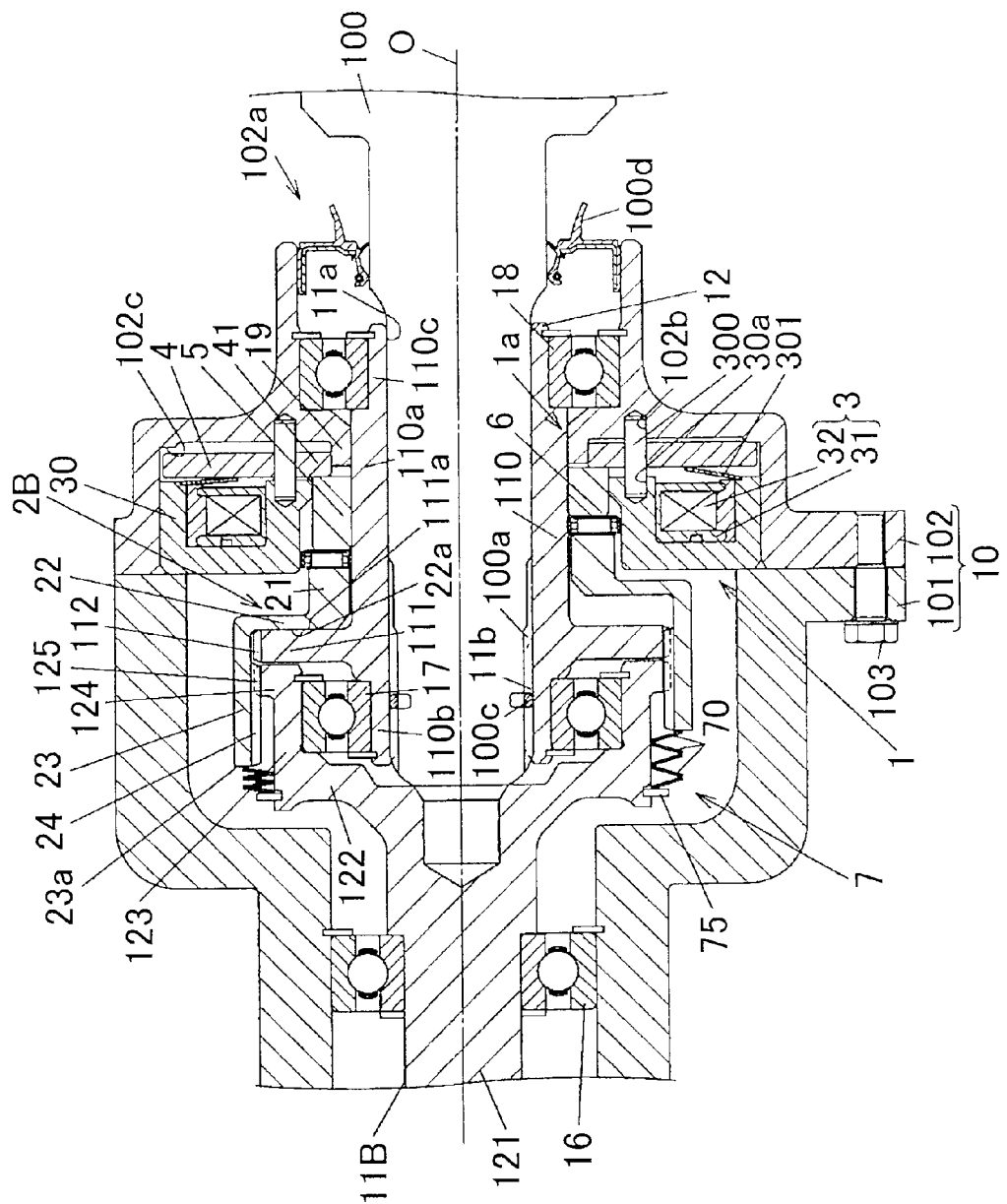
FIG. 11 is a sectional view of an electromagnetic clutch device according to a third embodiment.

FIG. 11 is a sectional view of an electromagnetic clutch device according to a third embodiment of the present invention and its vicinal area.

An electromagnetic clutch device 1 in the present embodiment connects a second rotational member 12 to a first rotational member 11B in a torque transmittable manner. The second rotational member 12 and the first rotational member 11B have a common rotation axis O so as to be coaxially supported by a housing 10 in a relatively rotatable manner. The housing 10 is constituted by a first housing member 101 and a second housing member 102, and the first housing member 101 and the second housing member 102 are fixed to each other via a plurality of bolts 103 (only one bolt 103 is illustrated in FIG. 11).

The first rotational member 11B is rotatably supported by a ball bearing 16 placed between the first rotational member 11B and the first housing member 101. The first rotational member 11B integrally includes: a shaft portion 121 supported by the ball bearing 16; an overhanging portion 122 formed to overhang radially outwardly from an end of the shaft portion 121; a cylindrical portion 123 extending from an outer end of the overhanging portion 122 toward the second rotational member 12 along the rotation axis O; a flange portion 124 formed to overhang further radially outwardly from a tip end of the cylindrical portion 123; and a spline portion 125 formed in an outer periphery of the flange portion 124.

The second rotational member 12 integrally includes: a cylindrical portion 110 having an insertion hole 11a formed so that a shaft 100 to be inserted from an opening 102a formed in the second housing member 102 passes therethrough; a flange portion 111 formed to overhang radially outwardly from an outer peripheral surface of the cylindrical portion 110; and a spline portion 112 serving as a first meshing portion formed in an outer periphery of the flange portion 111. An inner peripheral spline portion 11b splined to an outer peripheral spline portion 100a of the shaft 100 is formed on an inner surface of the insertion hole 11a. The second rotational member 12 and the shaft 100 are connected so as to be non-rotatable relative to each other due to the splining between the inner peripheral spline portion 11b and the outer peripheral spline portion 100a, and an axial relative movement thereof is regulated by a snap ring 100c. A sealing member 100d is provided so as to seal between an outer peripheral surface of the shaft 100 and an inner surface of the opening 102a of the second housing member 102.

That one end small-diameter portion 110b of the second rotational member 12 which is provided on a first-rotational-member-11B-side end of the second rotational member 12 in its axial direction is supported by a ball bearing 17 placed on an inner side of the cylindrical portion 123 of the first rotational member 11B, and the other end small-diameter portion 110c provided on that end of the second rotational member 12 which is closer to the opening 102a of the second housing member 102 is supported by a ball bearing 18 placed between the second rotational member 12 and the second housing member 102. A large diameter portion 110a having an outside diameter larger than the one end small-diameter portion 110b and the other end small-diameter portion 110c is formed between the one end small-diameter portion 110b and the other end small-diameter portion 110c, and a flange portion 111 is provided on that end of the large diameter portion 110a which is closer to the one end small-diameter portion 110b. The electromagnetic clutch device 1 is placed between an outer peripheral surface of the second rotational member 12 and the housing 10.

The electromagnetic clutch device 1 includes: a meshing member 2B connected to the first rotational member 11B so as to be axially movable but relatively non-rotatable relative to the first rotational member 11B; an electromagnetic coil 3 for generating a magnetic force by current application; an armature 4 to be axially moved due to the magnetic force of the electromagnetic coil 3; a biasing member 7 for biasing the meshing member 2B axially; and a pressing mechanism 1a for pressing the meshing member 2B against a biasing force of the biasing member 7 by an axial movement of the armature 4 so as to move the meshing member 2B axially.

The meshing member 2B integrally includes: a cylindrical portion 21 outwardly engaged with the large diameter portion 110a in the cylindrical portion 110 of the second rotational member 12; a flange portion 22 formed to overhang radially outwardly from that end of the cylindrical portion 21 which is closer to the flange portion 111 of the second rotational member 12; a cylindrical portion 23 extending from an outer end of the flange portion 22 toward the first rotational member 11B along the rotation axis O; and a spline portion 24 formed in an inner periphery of the cylindrical portion 23 and serving as a second meshing portion.

That facing surface 22a of the flange portion 22 of the meshing member 2B which faces the flange portion 111 of the second rotational member 12 and that facing surface 111a of the flange portion 111 of the second rotational member 12 which faces the flange portion 22 of the meshing member 2B axially face each other via a gap in a coupled state of the second rotational member 12 and the first rotational member 11B as illustrated on a lower side relative to the rotation axis O in FIG. 11. In the present embodiment, the facing surfaces 111a, 22a are both flat planes parallel to a radial direction of the rotation axis O, and when the meshing member 2B is pressed toward the first rotational member 11B due to an axial movement of the cam member 5 (as will be described later), the facing surface 22a is pressed against the facing surface 111a so as to frictionally slide over the facing surface 111a.

The spline portion 24 of the meshing member 2B is always meshed with the spline portion 125 provided in the first rotational member 11B, so that its rotation relative to the first rotational member 11B is regulated. Further, due to an axial movement of the meshing member 2B in a direction where the meshing member 2B is distanced from the first rotational member 11B, the spline portion 24 is meshed with the spline portion 112 provided in the second rotational member 12. When the spline portion 24 of the meshing member 2B is meshed with the spline portion 125 of the first rotational member 11B and the spline portion 112 of the second rotational member 12, the second rotational member 12 is connected to the first rotational member 11B in a torque transmittable manner via the meshing member 2B. That is, the spline portion 24 of the meshing member 2B is always meshed with the first rotational member 11B, and when the meshing member 2B axially moves, the spline portion 24 is also meshed with the second rotational member 12, and hereby, the second rotational member 12 is connected to the first rotational member 11B in a torque transmittable manner.

An upper side relative to the rotation axis O in FIG. 11 illustrates a state (an uncoupled state) where the spline portion 24 of the meshing member 2B is not meshed with the spline portion 112 of the second rotational member 12, and a lower side relative to the rotation axis O in FIG. 11 illustrates a state (a coupled state) where the spline portion 24 of the meshing member 2B is meshed with the spline portion 112 of the second rotational member 12.

A biasing member 7 biases the meshing member 2B in a direction where the spline portion 24 of the meshing member 2B is meshed with the spline portion 112 of the second rotational member 12. In the present embodiment, the biasing member 7 is constituted by a plurality of coned disc springs 70 arranged along a direction of the rotation axis O. However, the biasing member 7 may be constituted by an elastic body such as a coil spring or a rubber. Further, an axial one end of the biasing member 7 along the rotation axis O abuts with a snap ring 75 fitted to an outer periphery of the cylindrical portion 123 of the first rotational member 11B, and the other axial end thereof abuts with an axial end surface 23a of the cylindrical portion 23 of the meshing member 2B, so that the cylindrical portion 23 of the meshing member 2B is pressed toward the flange portion 111 of the second rotational member 12.

The electromagnetic coil 3 is formed by winding, around a bobbin 31 made from resin, a winding 32 through which a current supplied from a controller (not shown) flows. The electromagnetic coil 3 is held by an annular yoke 30 made from a ferromagnetic material such as iron, and the yoke 30 is supported by the second housing member 102. The yoke 30 has a plurality of holes 30a to which columnar pins 300 placed in parallel with the rotation axis O are fitted, and one ends of the pins 300 are inserted into the holes 30a. Further, the second housing member 102 has a plurality of holes 102b to which the other ends of the pins 300 are fitted.

Figure 12:
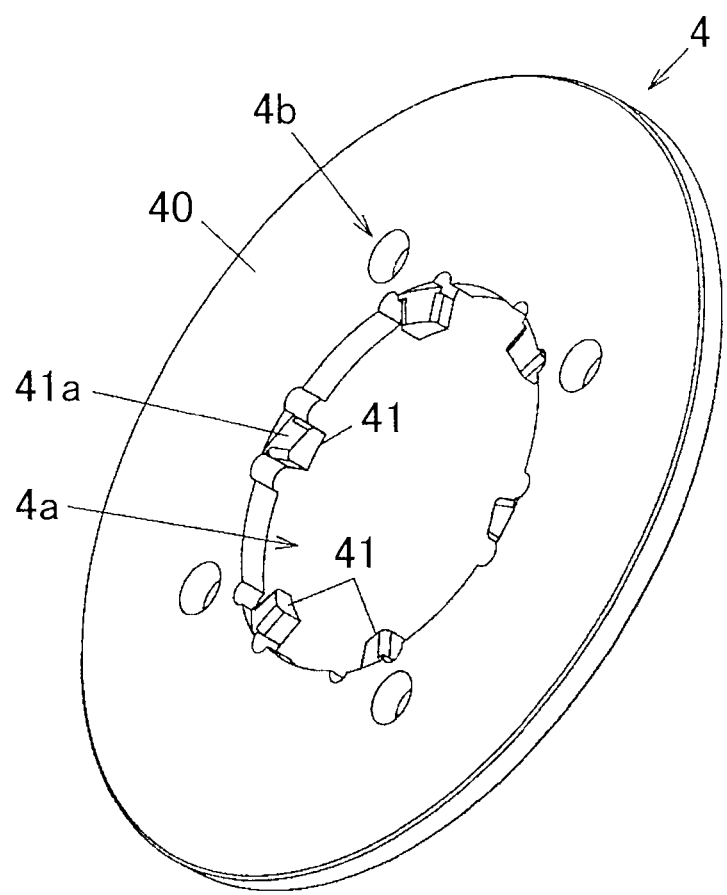
FIG. 12 is a perspective view illustrating an armature according to the third embodiment.

FIG. 12 is a perspective view illustrating the armature 4. The armature 4 integrally includes: an annular-disk shaped main body 40 having, in its center, a through hole 4a through which the second rotational member 12 passes; and a plurality of (six in the present embodiment) pressing projections 41 projecting from an inner peripheral surface of the through hole 4a toward the center of the main body 40. In the main body 40, pin insertion holes 4b through which a plurality of pins 300 (illustrated in FIG. 11) passes are formed at several places (four places in the present embodiment) around the through hole 4a. That facing surface 41a of the pressing projection 41 which is opposed to axial end surfaces 51a to 54a of first to fourth locked portions 51 to 54 of the cam member 5 (described later) is formed as an inclined surface that is inclined with respect to a thickness direction (a direction parallel to the rotation axis O) of the main body 40.

As illustrated in FIG. 11, the armature 4 is elastically pressed in a direction to be distanced from the yoke 30, by a coned disc spring 301 placed between the main body 40 and the yoke 30. When no current is applied to the electromagnetic coil 3, the armature 4 abuts with a receiving portion 102c of the second housing member 102 due to a pressing force of the coned disc spring 301, and when a current is applied to the electromagnetic coil 3, the armature 4 is drawn to the yoke 30 by a magnetic force thereof.

Further, a rotation of the armature 4 relative to the second housing member 102 and the yoke 30 is regulated by the plurality of pins 300 passing through the pin insertion holes 4b. Accordingly, the armature 4 is guided by the plurality of pins 300 so as to move between a first position in which the armature 4 abuts with the receiving portion 102c of the second housing member 102 and a second position in which the armature 4 comes close to the yoke 30. The upper side relative to the rotation axis O in FIG. 11 illustrates a state where the armature 4 is placed in the second position, and the lower side relative to the rotation axis O in FIG. 11 illustrates a state where the armature 4 is placed in the first position.

The pressing mechanism 1a includes a locking portion 19 provided so as to be axially immovable relative to the second rotational member 12 and relatively non-rotatable relative to the armature 4; and a cylindrical cam member 5 including a plurality of locked portions (the after-mentioned first to fourth locked portions 51 to 54) to be locked by the locking portion 19 at different axial positions. The pressing mechanism 1a is configured such that, in response to an axial movement of the armature 4, the locking portion 19 locks that another locked portion out of the plurality of locked portions which is placed at a different axial position.

The cam member 5 is outwardly engaged with the large diameter portion 110a in the cylindrical portion 110 of the second rotational member 12, as well as the meshing member 2B. The meshing member 2B and the cam member 5 are loosely fitted to the cylindrical portion 110 of the second rotational member 12, and are axially movable and relatively rotatable relative to the second rotational member 12. A rolling bearing 6 is placed between the meshing member 2B and the cam member 5. In the present embodiment, the rolling bearing 6 is constituted by a needle thrust roller bearing. The meshing member 2B is placed closer to the first rotational member 11B than the rolling bearing 6, and the cam member 5 is placed closer to the locking portion 19 than the rolling bearing 6.

The cam member 5 receives a pressing force of the biasing member 7 as an axial biasing force toward a plurality of locking portions 19 from the meshing member 2B via the rolling bearing 6. In the present embodiment, the plurality of locking portions 19 is formed integrally with the second housing member 102, but the plurality of locking portions 19 may be formed separately from the second housing member 102.

In response to the axial movement of the armature 4, the cam member 5 presses the meshing member 2B axially along the rotation axis O in a direction where the meshing between the spline portion 24 of the meshing member 2B and the spline portion 112 of the second rotational member 12 is released.

Figure 13:
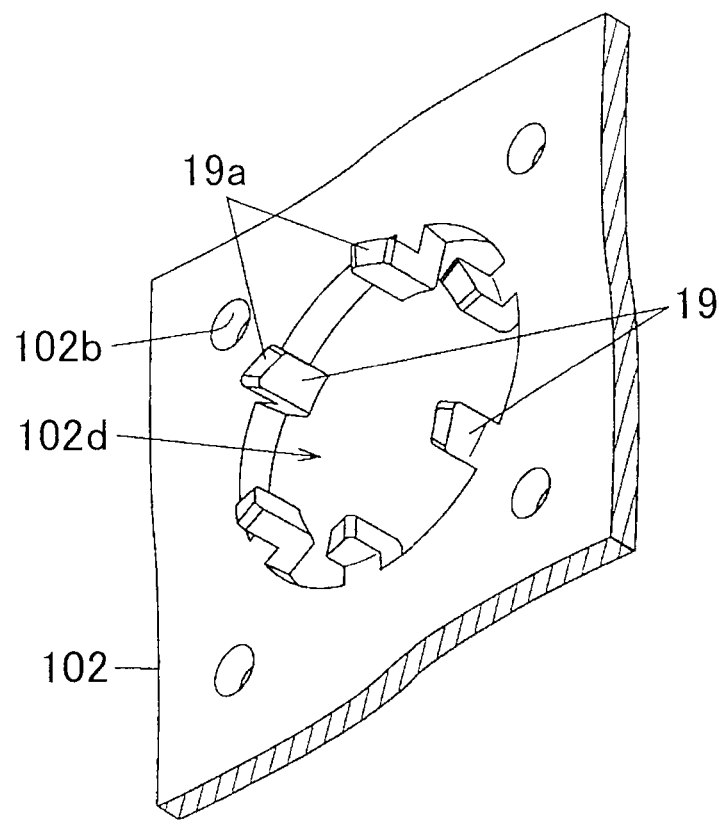
FIG. 13 is a perspective view illustrating a plurality of locking portions provided in a second housing member according to the third embodiment.

FIG. 13 is a perspective view illustrating the plurality of locking portions 19 provided in the second housing member 102.

The second housing member 102 has a through hole 102d through which the second rotational member 12 passes, and the plurality of locking portions 19 projects from an inner peripheral surface of the through hole 102d toward the second rotational member 12, and also projects toward the cam member 5 along the rotation axis O. The plurality of locking portions 19 is provided at regular intervals along a circumferential direction of the through hole 102d, and the number of the locking portions 19 is the same as the number of the pressing projections 41 of the armature 4. Similarly to the facing surface 41a of the pressing projection 41 of the armature 4, the locking portion 19 is formed such that that tip end surface 19a of the locking portion 19 which is opposed to the axial end surfaces 51a to 54a of the locked portions 51 to 54 of the cam member 5 (described later) is formed as an inclined surface that is inclined with respect to the direction parallel to the rotation axis O.

Figure 14:
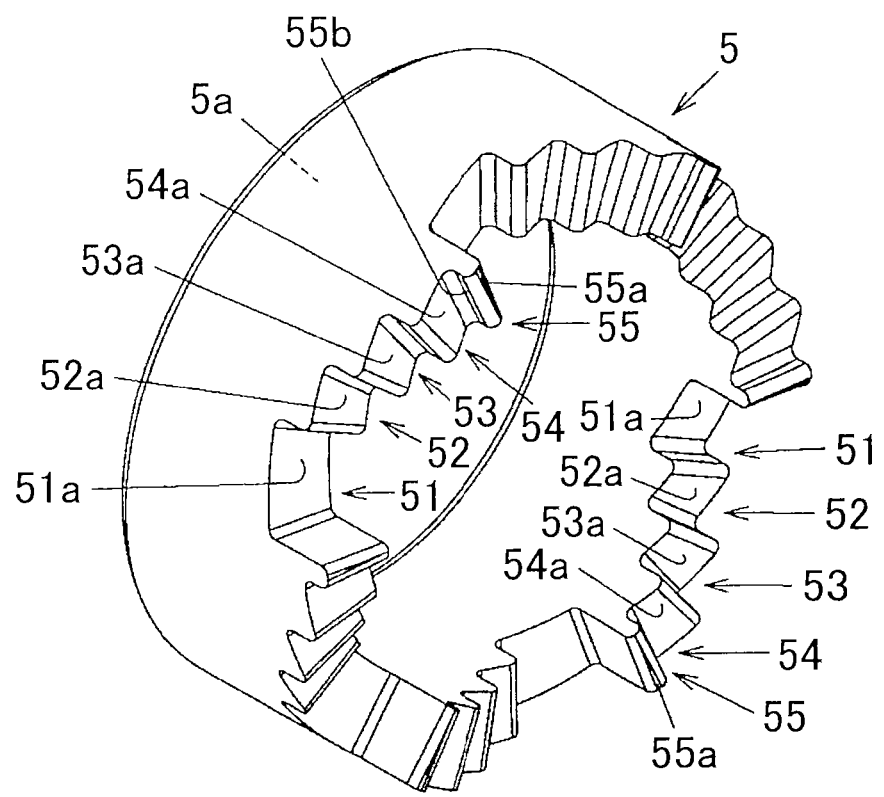
FIG. 14 is a perspective view illustrating a cam member according to the third embodiment.

FIG. 14 is a perspective view illustrating the cam member 5. In the cam member 5, a plurality of locked portions to be locked by the locking portion 19 at different axial positions is formed so as to be adjacent to each other in a circumferential direction. In the present embodiment, the plurality of locked portions is constituted by first to fourth locked portions 51 to 54. In an end opposite to a base end surface 5a with which the rolling bearing 6 abuts, six sets of the first to fourth locked portions 51 to 54 are formed along the circumferential direction.

When the cam member 5 is viewed clockwise from a direction of the rotation axis O, the first to fourth locked portions 51 to 54 in each set is configured such that the second locked portion 52 is formed adjacent to the first locked portion 51, the third locked portion 53 is formed adjacent to the second locked portion 52, and the fourth locked portion 54 is formed adjacent to the third locked portion 53. A wall portion 55 projecting axially is formed in that end of the fourth locked portion 54 which is opposite to the third locked portion 53.

The first to fourth locked portions 51 to 54 are placed at different positions in an axial direction of the cam member 5. The second locked portion 52 is farther from the base end surface 5a than the first locked portion 51, the third locked portion 53 is farther from the base end surface 5a than the second locked portion 52, and the fourth locked portion 54 is farther from the base end surface 5a than the third locked portion 53.

Respective axial end surfaces 51a to 54a of the first to fourth locked portions 51 to 54 are inclined with respect to the circumferential direction of the cam member 5. More specifically, the axial end surface 51a of the first locked portion 51 is inclined such that an end thereof on a second-locked portion-52 side is closer to the base end surface 5a, the axial end surface 52a of the second locked portion 52 is inclined such that an end thereof on a third-locked portion-53 side is closer to the base end surface 5a, the axial end surface 53a of the third locked portion 53 is inclined such that an end thereof on a fourth-locked portion-54 side is closer to the base end surface 5a, and the axial end surface 54a of the fourth locked portion 54 is inclined such that an end thereof on a wall-portion-55 side is closer to the base end surface 5a.

An axial end surface 55a of the wall portion 55 is inclined in the same direction as the axial end surfaces 51a to 54a. Further, one side surface of 55b of the wall portion 55 in its circumferential direction faces the fourth locked portion 54.

The facing surface 41a of the pressing projection 41 of the armature 4 and the tip end surface 19a of the locking portion 19 abut with the axial end surfaces 51a to 54a of the first to fourth locked portions 51 to 54. The facing surface 41a of the armature 4 abuts with outer parts of the axial end surfaces 51a to 54a in a radial direction of the cam member 5, and the tip end surface 19a of the locking portion 19 abuts with inner parts of the axial end surfaces 51a to 54a in the radial direction of the cam member 5. The cam member 5 receives, due to the biasing member 7, an axial biasing force at which the axial end surfaces 51a to 54a are pressed against the pressing projection 41 of the armature 4 and the locking portion 19.

When the locking portion 19 locks the first locked portion 51, a distance between the tip end surface 19a of the locking portion 19 and the base end surface 5a is shortest. Further, when the locking portion 19 locks the fourth locked portion 54, the distance between the tip end surface 19a of the locking portion 19 and the base end surface 5a is longest.

When the locking portion 19 locks the first locked portion 51, the spline portion 24 of the meshing member 2B is meshed with the spline portion 112 of the second rotational member 12, as illustrated on the lower side relative to the rotation axis O in FIG. 11. When the locking portion 19 locks the fourth locked portion 54, the meshing between the spline portion 24 of the meshing member 2B and the spline portion 112 of the second rotational member 12 is released, as illustrated on the upper side relative to the rotation axis O in FIG. 11. In a state where the locking portion 19 locks the second locked portion 52 or the third locked portion 53, the spline portion 24 of the meshing member 2B is meshed with part of the spline portion 112 of the second rotational member 12.

Next will be described an operation of the pressing mechanism 1a with reference to FIGS. 15 and 16.

FIGS. 15A to 15D are perspective views each illustrating the armature 4 and the cam member 5 without illustrating the second housing member 102 except for the plurality of locking portions 19. FIGS. 16A to 16D are schematic views each illustrating a state where the cam member 5 is viewed from an outside thereof in a radial direction, together with the pressing projection 41 of the armature 4 and the locking portion 19.

Figure 15A:
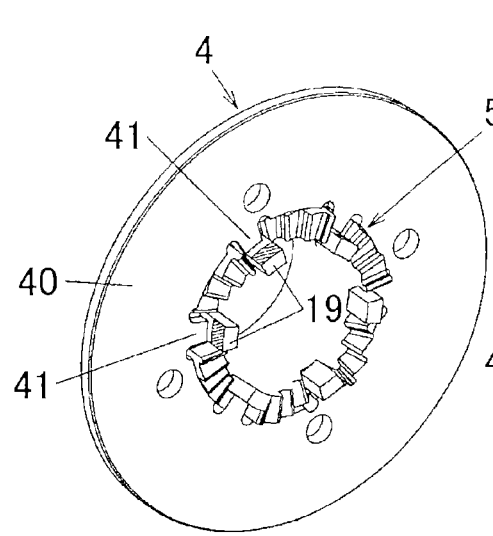
FIG. 15A is a perspective view of a pressing mechanism and illustrates the cam member according to the third embodiment as well as pressing projections of the armature and the locking portions.
Figure 16A:
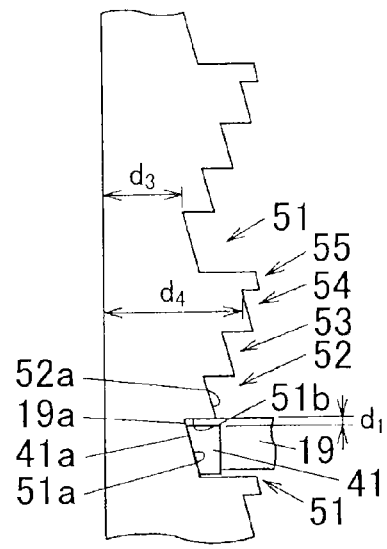
FIG. 16A is a schematic view of the cam member, the pressing projection of the armature, and the locking portion to describe an operation of the pressing mechanism according to the third embodiment.

FIGS. 15A and 16A illustrate a first state where the locking portion 19 locks the first locked portion 51 and the armature 4 is placed in a first position. In the first state, the axial end surface 51a of the first locked portion 51 is pressed against the tip end surface 19a of the locking portion 19 by a biasing force of the biasing member 7, and is also opposed to the facing surface 41a of the pressing projection 41 of the armature 4. Further, the locking portion 19 abuts with a circumferential side surface 51b of the first locked portion 51, and the pressing projection 41 of the armature 4 is opposed to the axial end surface 51a in a position distanced from the side surface 51b in the circumferential direction of the cam member 5. The side surface 51b of the first locked portion 51 is a stepped surface formed between the first locked portion 51 and the second locked portion 52, and is a flat plane parallel to the axial direction of the cam member 5. An angle formed between the axial end surface 51a and the side surface 51b in the first locked portion 51 is an acute angle.

Figure 15B:
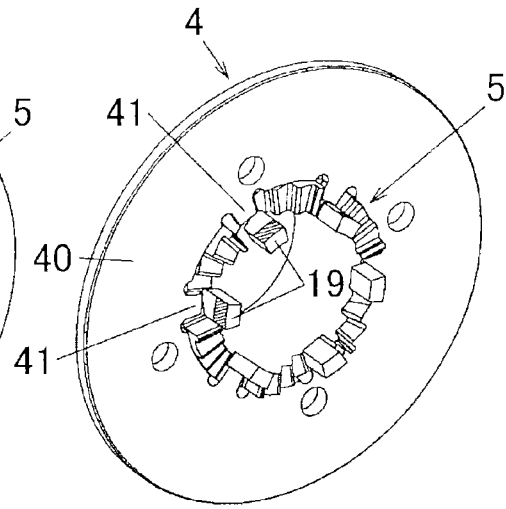
FIG. 15B is a perspective view of the pressing mechanism and illustrates the cam member according to the third embodiment as well as the pressing projections of the armature and the locking portions.
Figure 16B:
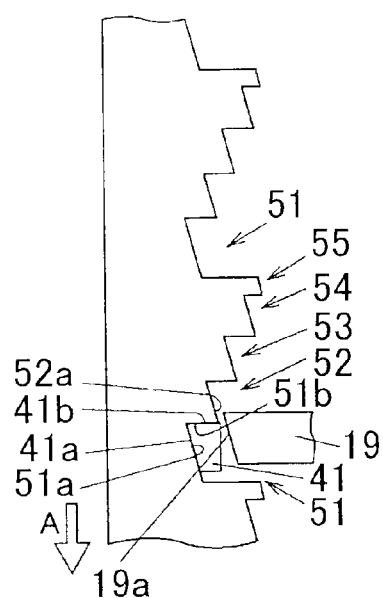
FIG. 16B is a schematic view of the cam member, the pressing projection of the armature, and the locking portion to describe the operation of the pressing mechanism according to the third embodiment.

FIGS. 15B and 16B illustrate a second state where a current is applied to the electromagnetic coil 3 and the armature 4 moves to a second position from the first state illustrated in FIGS. 15A and 16A. The facing surface 41a of the pressing projection 41 of the armature 4 abuts with the axial end surface 51a in a course of shifting from the first state to the second state, and the pressing projection 41 presses the cam member 5 toward the meshing member 2B. Further, in the second state, an abutting state of the locking portion 19 with respect to the side surface 51b of the first locked portion 51 is released, and due to sliding between the axial end surface 51a of the first locked portion 51 and the facing surface 41a of the pressing projection 41 of the armature 4, the cam member 5 rotates in an arrow-A direction only by a first predetermined angle. Due to the rotation of the cam member 5, the side surface 51b of the first locked portion 51 abuts with a side surface 41b of the pressing projection 41 of the armature 4.

That is, when the armature 4 axially moves from the first position to the second position, the armature 4 performs a pressing operation to press the cam member 5 toward the meshing member 2B so as to move the cam member 5 toward the meshing member 2B and to rotate the cam member 5 only by the first predetermined angle. The first predetermined angle is an angle corresponding to a distance d1 of a gap between the pressing projection 41 of the armature 4 and the side surface 51b of the first locked portion 51, as illustrated in FIG. 16A.

When the armature 4 is placed in the second position, the tip end surface 19a of the locking portion 19 is opposed to the axial end surface 52a via a gap between the tip end surface 19a and the second locked portion 52. That is, when the armature 4 moves to the second position, the cam member 5 rotates by the first predetermined angle, the pressing projection 41 abuts with the side surface 51b, and the tip end surface 19a of the locking portion 19 is opposed to the axial end surface 52a of the second locked portion 52 adjacent to the first locked portion 51.

Figure 15C:
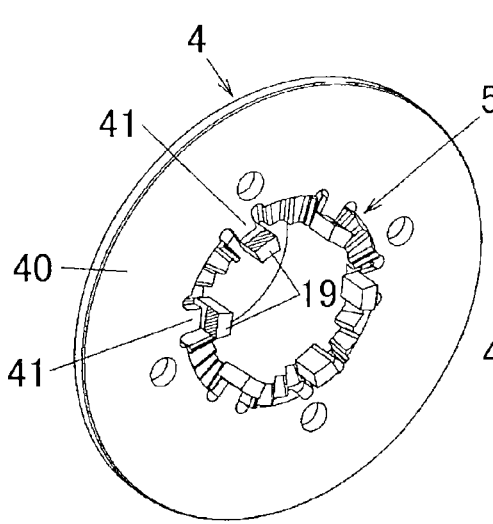
FIG. 15C is a perspective view of the pressing mechanism and illustrates the cam member according to the third embodiment as well as the pressing projections of the armature and the locking portions.
Figure 16C:
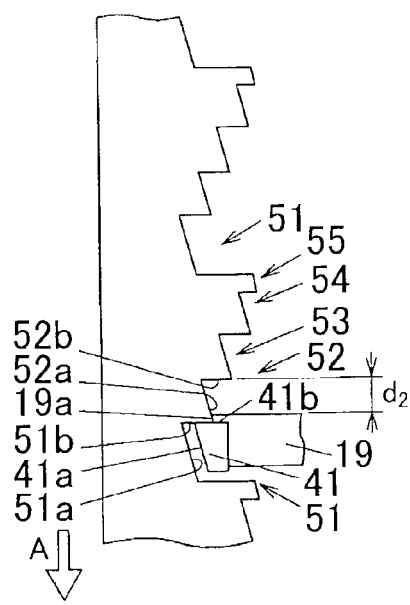
FIG. 16C is a schematic view of the cam member, the pressing projection of the armature, and the locking portion to describe the operation of the pressing mechanism according to the third embodiment.

FIGS. 15C and 16C illustrate a third state where current application to the electromagnetic coil 3 is stopped and the armature 4 is in the middle of returning to the first position from the second position. In the third state, the tip end surface 19a of the locking portion 19 abuts with the axial end surface 52a of the second locked portion 52. When the tip end surface 19a of the locking portion 19 abuts with the axial end surface 52a of the second locked portion 52, a rotational force toward the arrow-A direction is applied to the cam member 5, but the rotation of the cam member 5 to the arrow-A direction is regulated by the abutment of the side surface 41b of the pressing projection 41 of the armature 4 with respect to the side surface 51b of the first locked portion 51.

Figure 15D:
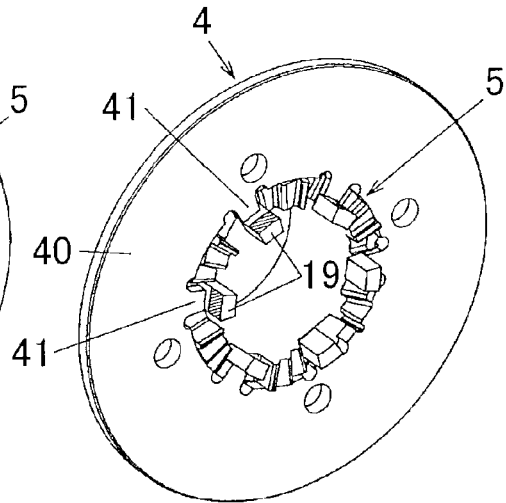
FIG. 15D is a perspective view of the pressing mechanism and illustrates the cam member according to the third embodiment as well as the pressing projections of the armature and the locking portions.
Figure 16D:
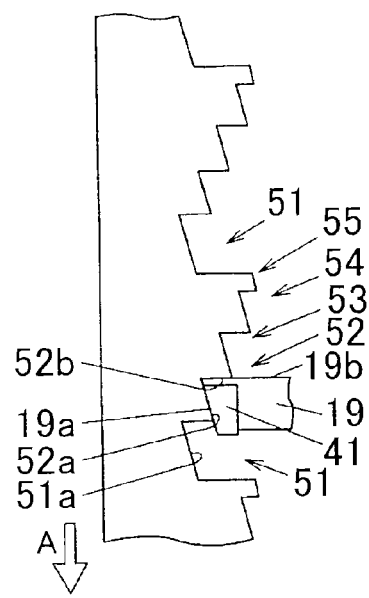
FIG. 16D is a schematic view of the cam member, the pressing projection of the armature, and the locking portion to describe the operation of the pressing mechanism according to the third embodiment.

FIGS. 15D and 16D illustrate a fourth state where the armature 4 returns to the first position, and the cam member 5 rotates in the arrow-A direction until a circumferential side surface 52b of the second locked portion 52 abuts with a side surface 19b of the locking portion 19. In the fourth state, due to sliding between the tip end surface 19a of the locking portion 19 and the axial end surface 52a of the second locked portion 52 of the cam member 5 that receives a biasing force of the biasing member 7, the cam member 5 rotates relative to the locking portion 19 by a second predetermined angle. Hereby, the locking portion 19 locks the second locked portion 52. The second predetermined angle is an angle corresponding to a distance d2 between the side surface 52b of the second locked portion 52 and the locking portion 19 in the third state illustrated in FIG. 16C. That is, when the armature 4 moves from the second position to the first position, the cam member 5 further rotates only by the second predetermined angle, and hereby, the locking portion 19 locks the second locked portion 52 adjacent to the first locked portion 51.

The pressing mechanism 1a is configured such that, when the armature 4 reciprocates between the first position and the second position several times, the cam member 5 axially moves the meshing member 2B against the biasing force of the biasing member 7. In the present embodiment, four locked portions (the first to fourth locked portions 51 to 54) formed in the cam member 5 in a stepped manner are provided. In view of this, when current application to the electromagnetic coil 3 and stop of the current application thereto are performed three times so that the armature 4 reciprocates between the first position and the second position three times, the cam member 5 rotates from a position where the locking portion 19 locks the first locked portion 51 to a position where the locking portion 19 locks the fourth locked portion 54.

When a distance from the base end surface 5a to the axial end surface 51a of the first locked portion 51 is taken as a distance d3 and a distance from the base end surface 5a to the axial end surface 54a of the fourth locked portion 54 is taken as a distance d4 as illustrated in FIG. 16A, the distance d4 is longer than the distance d3, and the cam member 5 reciprocates axially within a range corresponding to a difference between the distance d4 and the distance d3.

FIGS. 17A to 17D are schematic views to describe an operation at the time when a state where the locking portion 19 locks the fourth locked portion 54 is shifted to a state where the locking portion 19 locks the first locked portion 51, so that the electromagnetic clutch device 1 switches over from the uncoupled state to the coupled state.

Figure 17A:
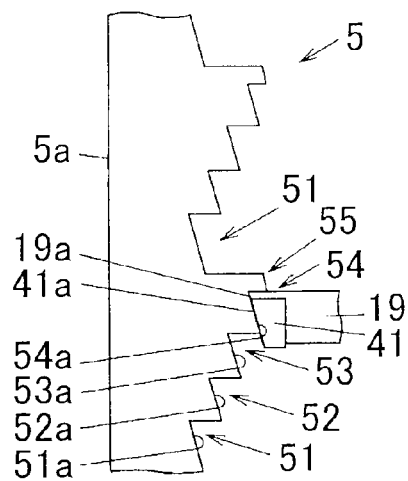
FIG. 17A is a schematic view of the cam member, the pressing projection of the armature, and the locking portion to describe an operation of the pressing mechanism at the time when the electromagnetic clutch device according to the third embodiment is shifted from an uncoupled state to a coupled state.

FIG. 17A illustrates a state where the locking portion 19 locks the fourth locked portion 54 and the armature 4 is placed in the first position. In this state, the locking portion 19 abuts with the axial end surface 54a of the fourth locked portion 54 and a circumferential side surface 55b of the wall portion 55.

Figure 17B:
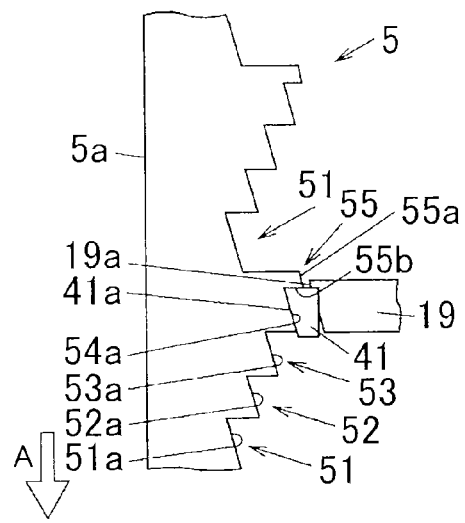
FIG. 17B is a schematic view of the cam member, the pressing projection of the armature, and the locking portion to describe the operation of the pressing mechanism at the time when the electromagnetic clutch device according to the third embodiment is shifted from the uncoupled state to the coupled state.

FIG. 17B illustrates a state where the armature 4 moves to the second position. In a course of a movement of the armature 4 from the first position to the second position, the pressing projection 41 presses and moves the cam member 5 toward the meshing member 2B due to a pressing operation. At this time, as illustrated on the upper side relative to the rotation axis O in FIG. 11, that facing surface 22a of the flange portion 22 of the meshing member 2B is axially pressed against the facing surface 111a of the flange portion 111 of the second rotational member 12. Hereby, in a case where the second rotational member 12 and the first rotational member 11B rotate relative to each other with a rotation speed difference, the facing surfaces 22a, 111a frictionally slide over each other, thereby causing a friction torque that synchronizes the rotation of the second rotational member 12 with the rotation of the first rotational member 11B.

More specifically, the friction torque is caused when the facing surface 22a of the flange portion 22 of the meshing member 2B is pressed against the facing surface 111a of the flange portion 111 of the second rotational member 12 due to the axial movement of the cam member 5 along with the pressing operation of the armature 4. That is, the armature 4 performs the pressing operation to press the cam member 5 before the locking portion 19 locks the first locked portion 51, so as to cause the friction torque to reduce the rotation speed difference between the second rotational member 12 and the first rotational member 11B.

Further, when the state where the locking portion 19 abuts with the circumferential side surface 55b of the wall portion 55 is released by the pressing operation, the cam member 5 rotates in the arrow-A direction only by the first predetermined angle.

The facing surface 111a of the flange portion 111 of the second rotational member 12 is one aspect of a "first friction surface on a second rotational member side" of the present invention, and the facing surface 22a of the flange portion 22 of the meshing member 2B is one aspect of a "second friction surface on a first rotational member side" of the present invention. Here, the "first friction surface on the second rotational member side" includes a friction surface formed in a member provided so as to rotate integrally with the second rotational member 12 as well as a friction surface formed in the second rotational member 12, and the "second friction surface on the first rotational member side" includes a friction surface formed in a member (the meshing member 2B) provided so as to rotate integrally with the first rotational member 11B as well as a friction surface formed in the first rotational member 11B. For example, a first friction surface formed in a member provided so as to be non-rotatable relative to the second rotational member 12, and a second friction surface formed in the first rotational member 11B frictionally slide over each other so as to cause a friction torque.

Figure 17C:
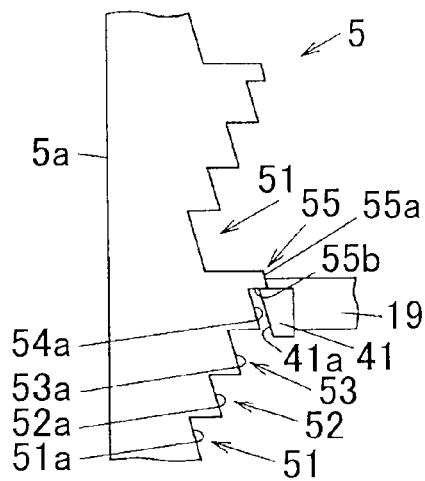
FIG. 17C is a schematic view of the cam member, the pressing projection of the armature, and the locking portion to describe the operation of the pressing mechanism at the time when the electromagnetic clutch device according to the third embodiment is shifted from the uncoupled state to the coupled state.

FIG. 17C illustrates a state where the armature 4 is in the middle of returning to the first position from the second position. In this state, the tip end surface 19a of the locking portion 19 abuts with the axial end surface 55a of the wall portion 55, and a rotational force toward the arrow-A direction is applied to the cam member 5.

Figure 17D:
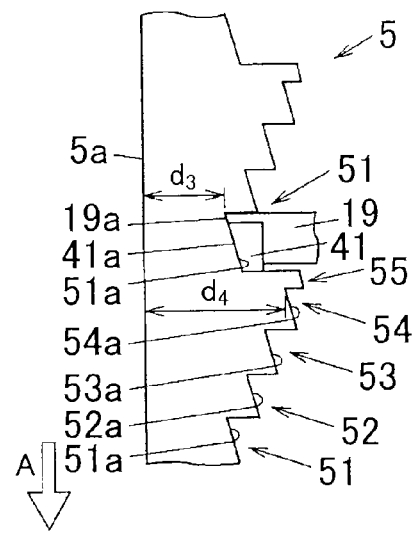
FIG. 17D is a schematic view of the cam member, the pressing projection of the armature, and the locking portion to describe the operation of the pressing mechanism at the time when the electromagnetic clutch device according to the third embodiment is shifted from the uncoupled state to the coupled state.

FIG. 17D illustrates a state where the armature 4 returns to the first position and the locking portion 19 rotates in the arrow-A direction to lock the first locked portion 51. In a course of shifting from the state illustrated in FIG. 17C to the state illustrated in FIG. 17D, the cam member 5 is largely displaced in the axial direction throughout the range corresponding to the difference between the distance d3 and the distance d4, so that the spline portion 24 of the meshing member 2B is meshed with the spline portion 112 of the second rotational member 12.

As such, when the cam member 5 axially moves in a direction opposite to a direction where the armature 4 axially moves due to a magnetic force, the spline portion 24 of the meshing member 2B is meshed with the spline portion 112 of the second rotational member 12 due to the biasing force of the biasing member 7. More specifically, when the locking of the locking portion 19 with respect to the fourth locked portion 54 formed in a position farthest from the meshing member 2B among the first to fourth locked portions 51 to 54 is released and the locking portion 19 locks the first locked portion 51 formed in a position nearest to the meshing member 2B, the spline portion 24 is meshed with the spline portion 112 of the second rotational member 12 due to the biasing force of the biasing member 7, so as to cause the coupled state where the second rotational member 12 is connected to the first rotational member 11B in a torque transmittable manner.

That is, when the coupled state between the second rotational member 12 and the first rotational member 11B is shifted to the uncoupled state, it is necessary for the armature 4 to reciprocate between the first position and the second position three times. However, when the uncoupled state is shifted to the coupled state, the armature 4 reciprocates between the first position and the second position only once.

According to the embodiment described above, it is possible to obtain the following operation/working-effect.

The meshing member 2B moves axially along with the axial movement of the armature 4 from the first position to the second position so as to be meshed with the first rotational member 11B. Accordingly, in comparison with a case where an electric motor and a speed reducer are used as an actuator for operating a clutch device, for example, it is possible to perform switching between the coupled state and the uncoupled state immediately. That is, responsiveness of switching improves.

In the electromagnetic clutch device 1, in a course of shifting from the uncoupled state between the second rotational member 12 and the first rotational member 11B to the coupled state, the facing surface 22a of the flange portion 22 of the meshing member 2B is axially pressed against the facing surface 111a of the flange portion 111 of the second rotational member 12, thereby causing a friction torque that synchronizes the rotation of the second rotational member 12 with the rotation of the first rotational member 11B. Accordingly, in comparison with a case where no friction torque is caused, the spline portion 24 of the meshing member 2B is smoothly meshed with the spline portion 112 of the second rotational member 12. This makes it possible to perform switching from the uncoupled state to the coupled state immediately, and responsiveness of the switching from the uncoupled state to the coupled state improves. Further, by causing the armature 4 to reciprocate between the first position and the second position once from the state where the locking portion 19 locks the fourth locked portion 54, the spline portion 24 is meshed with the spline portion 112 of the second rotational member 12 due to the biasing force of the biasing member 7. This makes it possible to sufficiently improve responsiveness of the switching from the uncoupled state to the coupled state.

Since the axial end surfaces 51a to 54a of the first to fourth locked portions 51 to 54 of the cam member 5 are inclined with respect to the circumferential direction, the axial end surfaces 51a to 54a slide over the facing surface 41a of the pressing projection 41 due to the axial movement of the armature 4 from the first position to the second position, and thus, the cam member 5 rotates only by the first predetermined angle. Further, when the armature 4 axially moves from the second position to the first position, the cam member 5 rotates by the second predetermined angle due to the inclination of the axial end surfaces 51a to 54a. That is, since the cam member 5 rotates due to the axial movement of the armature 4, it is possible to sequentially switch respective locking states of the locking portion 19 with respect to the first to fourth locked portions 51 to 54 from one to another, without any rotational drive mechanism such as a motor for rotating the cam member 5. This makes it possible to downsize the electromagnetic clutch device 1 and to reduce cost thereof.

The biasing member 7 is placed between the first rotational member 11B and the meshing member 2B, so that the meshing member 2B is biased by a biasing force thereof toward the second rotational member 12, and the cam member 5 is pressed, via the rolling bearing 6, toward the locking portion 19 and the pressing projection 41 of the armature 4. Hereby, the spline portion 24 of the meshing member 2B is immediately meshed with the spline portion 112 of the second rotational member 12 at the time when the locking portion 19 locks the first locked portion 51. Further, sliding of the axial end surfaces 51a to 54a of the first to fourth locked portions 51 to 54 and the axial end surface 55a of the wall portion 55 with respect to the facing surface 41a of the pressing projection 41 and the tip end surface 19a of the locking portion 19 allows the cam member 5 to rotate.

In a state where the locking portion 19 locks the first locked portion 51 of the cam member 5 and current application to the electromagnetic coil 3 is stopped, the meshing member 2B is meshed with the second rotational member 12. Accordingly, it is not necessary to continue the current application to the electromagnetic coil 3 in the coupled state. This makes it possible to reduce power consumption and heat generation at the time of the operation of the electromagnetic clutch device 1.

The cam member 5 includes the first to fourth locked portions 51 to 54 placed at different axial positions, and is axially movable within a range corresponding to an axial distance between the fourth locked portion 54 formed in a position farthest from the meshing member 2B and the first locked portion 51 formed in a position nearest to the meshing member 2B. This makes it possible to increase an axial length of the meshing between the spline portion 24 of the meshing member 2B and the spline portion 112 of the second rotational member 12. This makes it possible to transmit a large torque such as a driving force of the vehicle, for example.

When the cam member 5 axially moves in a direction opposite to a direction where the armature 4 axially moves due to a magnetic force, the spline portion 24 of the meshing member 2B is meshed with the spline portion 112 of the second rotational member 12. That is, a direction where the biasing member 7 biases the meshing member 2B is the same as a direction where the coned disc spring 301 biases the armature 4. Accordingly, at the time when the spline portion 24 of the meshing member 2B is meshed with the spline portion 112 of the second rotational member 12 due to the biasing force of the biasing member 7, a biasing force of the coned disc spring 301 does not disturb the movement of the meshing member 2B. This makes it possible to improve responsiveness of the switching from the uncoupled state to the coupled state.

Note that the present embodiment deals with a case where the cam member 5 includes four locked portions (the first to fourth locked portions 51 to 54) placed at different positions in the axial direction thereof. However, if a plurality of locked portions is formed in at least three different positions in the axial direction, it is possible to obtain the operation/ working-effect of the present embodiment.

Figure 18:
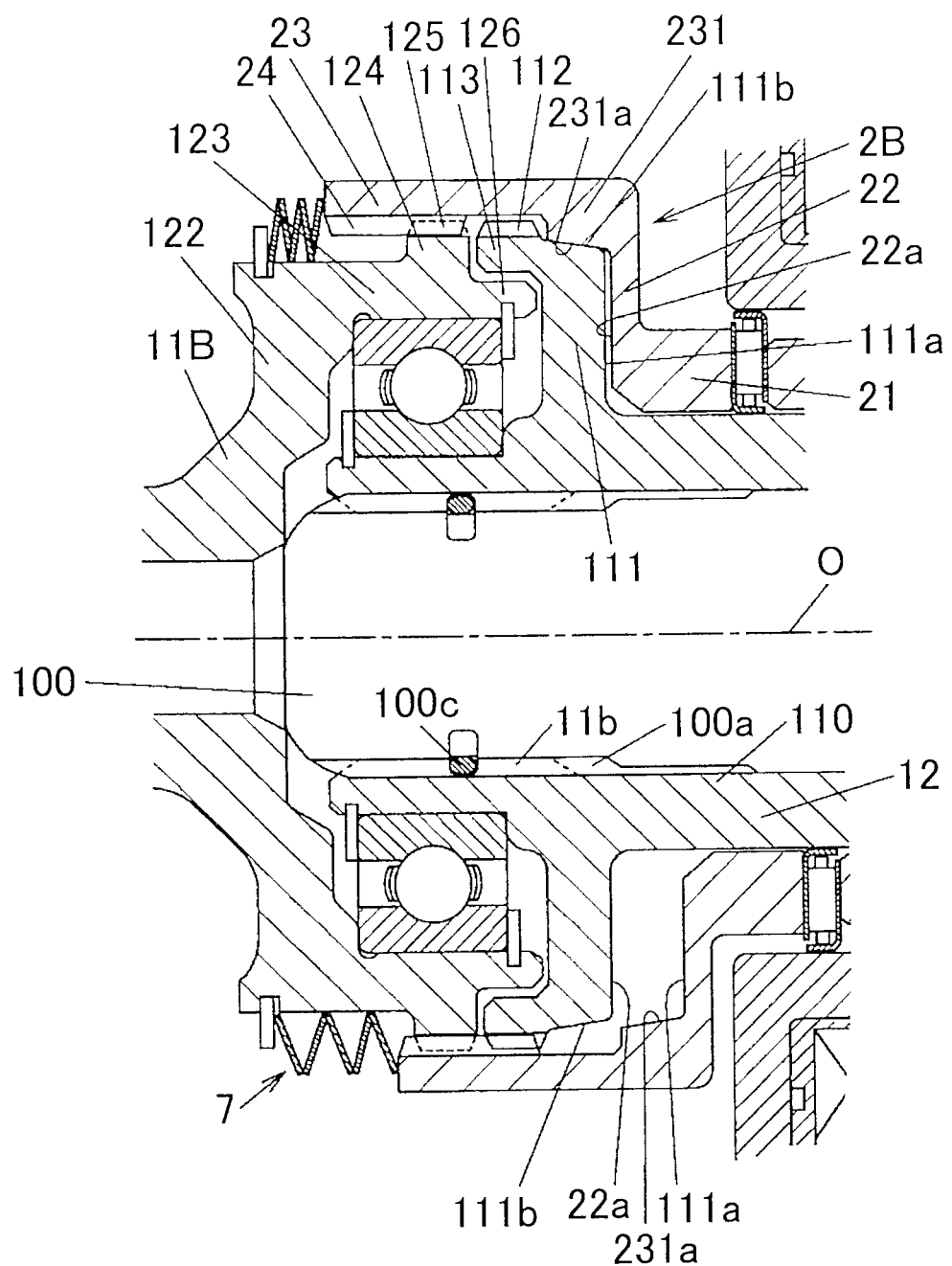
FIG. 18 is an enlarged view illustrating an electromagnetic clutch device according to a fourth embodiment.

Next will be described a fourth embodiment of the present invention with reference to FIG. 18. FIG. 18 is an enlarged view illustrating an essential part of a meshing member 2B, a second rotational member 12, and a first rotational member 11B according to the fourth embodiment. Note that, similarly to FIG. 11, an upper side relative to a rotation axis O in FIG. 18 illustrates an uncoupled state, and a lower side relative to the rotation axis O in FIG. 18 illustrates a coupled state. Further, in the fourth embodiment, a constituent having the same function as that of a constituent described in the third embodiment has the same reference sign as the constituent in the third embodiment, and a redundant description thereof is omitted.

The present embodiment is different from the third embodiment in terms of shapes of a second rotational member 12, a first rotational member 11B, and a meshing member 2B.

A flange portion 111 of the second rotational member 12 according to the present embodiment is provided with a rib portion 113 formed so as to project from an outer end of the flange portion 111 toward a first rotational member in a direction parallel to the rotation axis O. A spline portion 112 is formed in an outer periphery of the rib portion 113. Further, an outer peripheral surface 111b of the flange portion 111 is inclined with respect to the direction parallel to the rotation axis O, and is formed as a tapered surface of which an outside diameter is gradually increased from a side closer to a flange portion 22 of the meshing member 2B toward a side closer to the spline portion 112.

Further, the first rotational member 11B according to the present embodiment is provided with a cylindrical smalldiameter tubular portion 126 formed so as to project toward the flange portion 111 inside the rib portion 113 of the second rotational member 12 and to have an outside diameter smaller than a cylindrical portion 123.

Furthermore, a shape of a cylindrical portion 23 of the meshing member 2B according to the present embodiment is different from that of the third embodiment, and a swelling portion 231 swelling radially inwardly is formed in a flangeportion-22-side end of the cylindrical portion 23. An inner peripheral surface 231a of the swelling portion 231 is formed as a tapered surface inclined with respect to the rotation axis O so as to face an outer peripheral surface 111b of the flange portion 111 of the second rotational member 12 in a parallel manner.

In the present embodiment, in a course of shifting from the uncoupled state to the coupled state as described in the third embodiment with reference to FIG. 17, when an armature 4 performs a pressing operation to press a cam member 5 toward the meshing member 2B, the inner peripheral surface 231a of the swelling portion 231 of the meshing member 2B is pressed against the outer peripheral surface 111b of the flange portion 111 of the second rotational member 12 due to an axial movement of the cam member 5, so that the inner peripheral surface 231a frictionally slides over the outer peripheral surface 111b, thereby causing a friction torque. The friction torque synchronizes a rotation of the second rotational member 12 with a rotation of the first rotational member 11B. The outer peripheral surface 111b of the flange portion 111 of the second rotational member 12 is one aspect of the first friction surface of the present invention, and the inner peripheral surface 231a of the swelling portion 231 of the meshing member 2B is one aspect of the second friction surface of the present invention.

Note that, in the present embodiment, at the time when the outer peripheral surface 111b of the flange portion 111 of the second rotational member 12 frictionally slides over the inner peripheral surface 231a of the swelling portion 231 of the meshing member 2B, a facing surface 111a of the flange portion 111 of the second rotational member 12 does not make contact with a facing surface 22a of the flange portion 22 of the meshing member 2B. That is, a pressing force by the pressing operation of the armature 4 is received such that the inner peripheral surface 231a of the swelling portion 231 of the meshing member 2B abuts with the outer peripheral surface 111b of the flange portion 111 of the second rotational member 12.

According to the fourth embodiment, the outer peripheral surface 111b of the flange portion 111 of the second rotational member 12 and the inner peripheral surface 231a of the swelling portion 231 of the meshing member 2B that frictionally slide over each other are formed as tapered surfaces. Accordingly, in addition to the operation/working-effect similar to the third embodiment, a contact pressure that the outer peripheral surface 111b (the first friction surface) of the flange portion 111 of the second rotational member 12 receives from the inner peripheral surface 231a (the second friction surface) of the swelling portion 231 of the meshing member 2B is increased in comparison with the third embodiment. This makes it possible to further increase the friction torque, thereby resulting in that responsiveness of switching from the uncoupled state to the coupled state is further improved.

Figure 19:
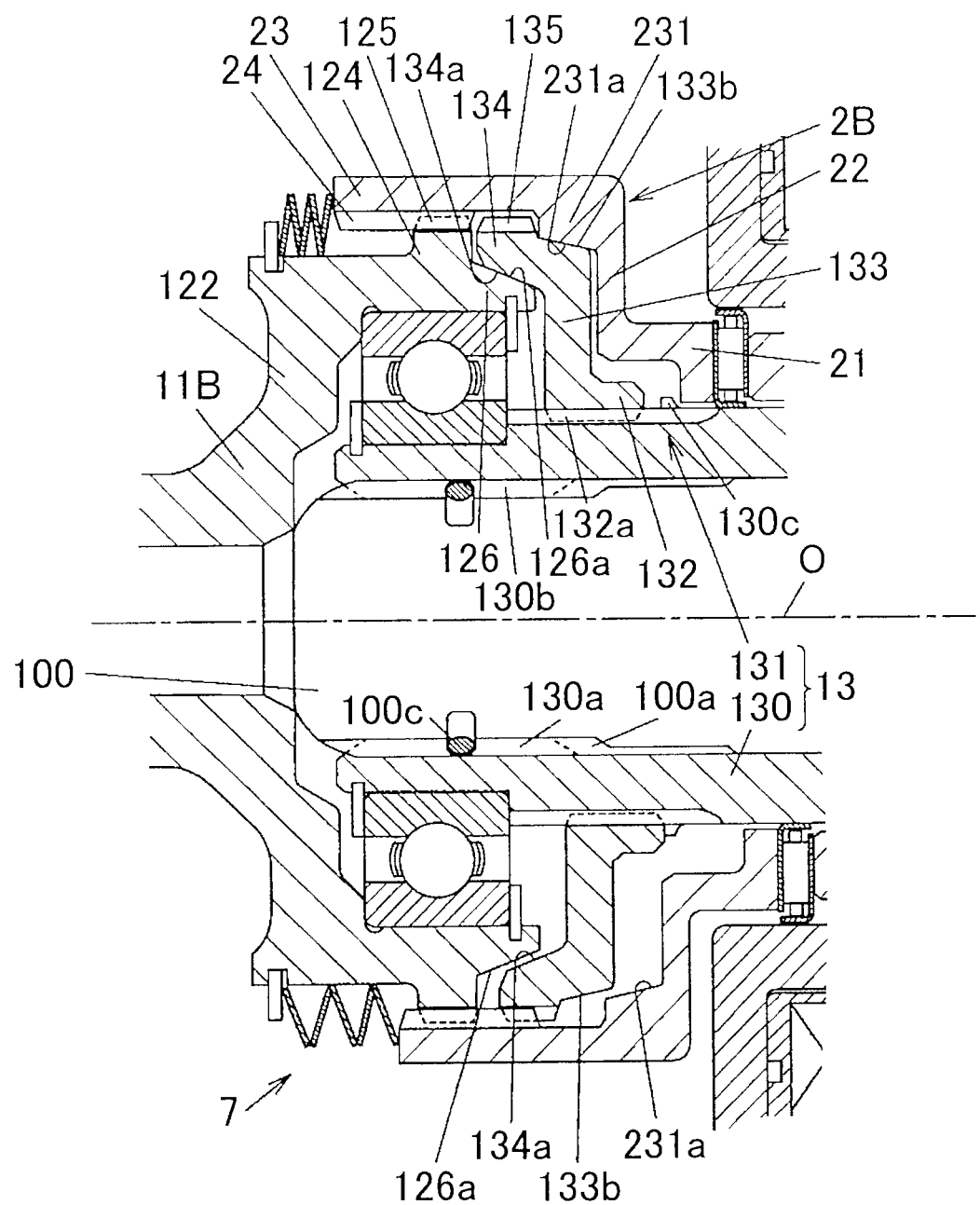
FIG. 19 is an enlarged view illustrating the electromagnetic clutch device according to the fourth embodiment.

Next will be described a fifth embodiment of the present invention with reference to FIG. 19. FIG. 19 is an enlarged view illustrating an essential part of a meshing member 2B, a second rotational member 13, and a first rotational member 11B according to the fifth embodiment. Note that, similarly to FIGS. 11 and 18, an upper side relative to a rotation axis O in FIG. 19 illustrates an uncoupled state, and a lower side relative to the rotation axis O in FIG. 19 illustrates a coupled state. Further, in the fifth embodiment, a constituent having the same function as that of a constituent described in the third or fourth embodiment has the same reference sign as the constituent in the third or fourth embodiment, and a redundant description thereof is omitted.

The second rotational member 13 according to the fifth embodiment is different from the second rotational member 12 according to the fourth embodiment in terms of a shape, and is configured to include a cylindrical fixing member 130, and a moving member 131 projecting radially outwardly from an outer peripheral surface of the second rotational member 13. The moving member 131 is provided so as to be axially movable but relatively non-rotatable relative to the fixing member 130. The moving member 131 is also axially movable relative to the first rotational member 11B along the rotation axis O.

An inner peripheral spline portion 130a splined to an outer peripheral spline portion 100a of a shaft 100 is formed on an inner peripheral surface of the fixing member 130. The inner peripheral spline portion 130a of the fixing member 130 is splined to the outer peripheral spline portion 100a of the shaft 100 so that their relative rotation is regulated, and an axial relative movement of the fixing member 130 is regulated by a snap ring 100c. Thus, the fixing member 130 is fixed to the shaft 100.

Further, an outer peripheral spline portion 130b is formed on an outer peripheral surface of the fixing member 130 along the rotation axis O. The outer peripheral spline portion 130b is provided with a locking projection 130c for restricting a range of an axial movement of the moving member 131, in one place on the outer peripheral spline portion 130b in its axial direction.

The moving member 131 integrally includes: a cylindrical portion 132 provided with an inner peripheral spline portion 132a splined to the outer peripheral spline portion 130b of the fixing member 130; a circular plate portion 133 having an annular disk shape and extending radially outwardly from a first-rotational-member-11B-side end of the cylindrical portion 132; a rib portion 134 projecting from an outer end of the circular plate portion 133 toward the first rotational member 11B in a direction parallel to the rotation axis O; and a spline portion 135 formed in an outer periphery of the rib portion 134.

The moving member 131 is axially movable but relatively non-rotatable relative to the fixing member 130 due to splining between the inner peripheral spline portion 132a and the outer peripheral spline portion 130b of the fixing member 130. Further, when the cylindrical portion 132 is locked by the locking projection 130c, an axial movement of the moving member 131 toward a cam member 5 is regulated.

When the spline portion 135 of the moving member 131 is splined to the spline portion 125 of the meshing member 2B, the second rotational member 13 is connected to the first rotational member 11B in a torque transmittable manner.

An outer peripheral surface 133b of the circular plate portion 133 is inclined with respect to the direction parallel to the rotation axis O, and is formed as a tapered surface of which an outside diameter is gradually increased from a side closer to a flange portion 22 of the meshing member 2B toward a side closer to the spline portion 135. Further, an inner peripheral surface 134a of the rib portion 134 is inclined with respect to the direction parallel to the rotation axis O, and is formed as a tapered surface of which an inside diameter is gradually decreased toward the circular plate portion 133.

Further, in the present embodiment, an outer peripheral surface 126a of a small-diameter tubular portion 126 of the first rotational member 11B is formed as a tapered surface facing the inner peripheral surface 134a of the rib portion 134 of the moving member 131 in a parallel manner.

In the present embodiment, in a course of shifting from the uncoupled state to the coupled state as described in the third embodiment with reference to FIG. 17, when an armature 4 performs a pressing operation to press the cam member 5 toward the meshing member 2B, an inner peripheral surface 231a of a swelling portion 231 is pressed against the outer peripheral surface 133b of the circular plate portion 133 due to an axial movement of the meshing member 2B. Further, when the outer peripheral surface 133b of the circular plate portion 133 receives a pressing force at this time, the moving member 131 axially moves toward the first rotational member 11B, so that the inner peripheral surface 134a of the rib portion 134 is pressed against the outer peripheral surface 126a of the small-diameter tubular portion 126 of the first rotational member 11B.

Hereby, in a case where the armature 4 performs the pressing operation at the time when the second rotational member 12 and the first rotational member 11B rotate relative to each other with a rotational speed difference, the inner peripheral surface 231a of the swelling portion 231 of the meshing member 2B frictionally slides over the outer peripheral surface 133b of the circular plate portion 133 of the moving member 131, and the inner peripheral surface 134a of the rib portion 134 of the moving member 131 frictionally slides over the outer peripheral surface 126a of the small-diameter tubular portion 126 of the first rotational member 11B, thereby causing a friction torque that synchronizes the rotation of the second rotational member 12 with the rotation of the first rotational member 11B.

The outer peripheral surface 133b of the circular plate portion 133 of the moving member 131 and the inner peripheral surface 134a of the rib portion 134 are one aspect of the first friction surface of the present invention. Further, the inner peripheral surface 231a of the swelling portion 231 of the meshing member 2B and the outer peripheral surface 126a of the small-diameter tubular portion 126 of the first rotational member 11B are one aspect of the second friction surface of the present invention.

According to the fifth embodiment, a friction torque is also caused between the inner peripheral surface 134a of the rib portion 134 of the moving member 131 and the outer peripheral surface 126a of the small-diameter tubular portion 126 of the first rotational member 11B. Accordingly, in addition to the operation/working-effect similar to the fourth embodiment, it is possible to further increase the friction torque in comparison with the fourth embodiment, thereby making it possible to further improve responsiveness of switching from the uncoupled state to the coupled state.

Next will be described a sixth embodiment of the present invention with reference to FIGS. 20 to 24. In FIGS. 20 to 24, a constituent having substantially the same function as that of a constituent described in the third embodiment has the same reference sign as in the third embodiment, and a redundant description thereof is omitted.

Figure 20:
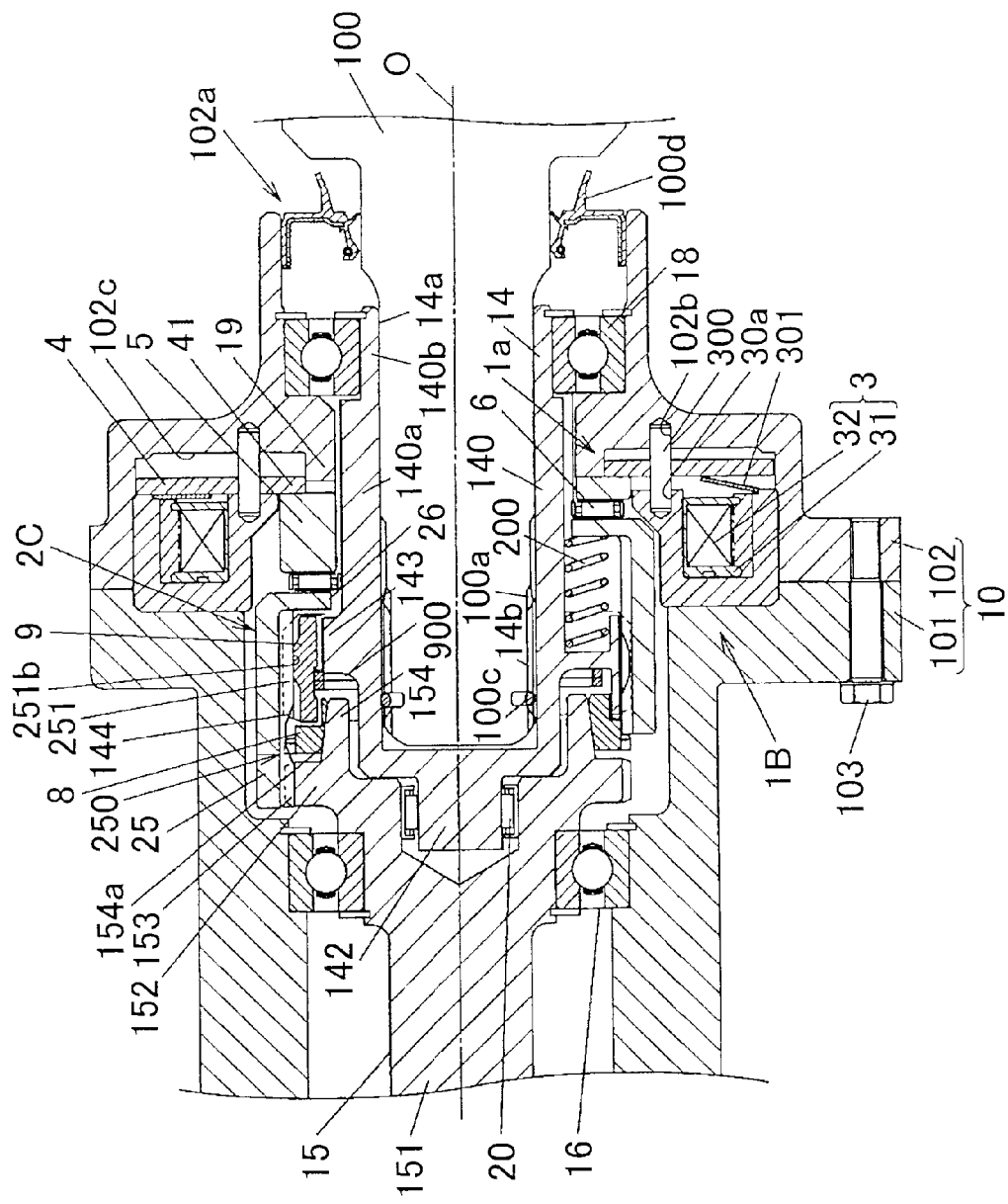
FIG. 20 is a sectional view of the electromagnetic clutch device according to the fourth embodiment and its vicinal area.

FIG. 20 is a sectional view of an electromagnetic clutch device 1B according to the present embodiment and its vicinal area. In the third to fifth embodiments, the second rotational member 12, 13 is splined to the shaft 100 in a relatively non-rotatable manner, and the first rotational member 11B is connected to the second rotational member 12, 13 by the electromagnetic clutch device 1 in a torque transmittable manner. However, in the present embodiment, a second rotational member 14 is splined to a shaft 100 in a relatively non-rotatable manner, and a meshing member 2C is connected to the second rotational member 14 so as to be axially movable but relatively non-rotatable relative to the second rotational member 14. The electromagnetic clutch device 1B connects, in a torque transmittable manner, the second rotational member 14 to a first rotational member 15 provided coaxially with the second rotational member 14 and supported by a housing 10 in a relatively rotatable manner.

Further, in the third to fifth embodiments, the second rotational member 12, 13 makes direct contact with the first rotational member 11B. However, in the present embodiment, a ring-shaped friction member 8 is placed between the meshing member 2C and the first rotational member 15, and the friction member 8 receives a pressing force toward the first rotational member 15 via a plurality of keys 9 elastically engaged with the meshing member 2C within a predetermined range, thereby causing a friction torque between the friction member 8 and the first rotational member 15. The meshing member 2C is axially biased by a plurality of coil springs 200 placed between the meshing member 2C and a flange portion 143 of the second rotational member 14 (described later), and the plurality of keys 9 is elastically pressed against the meshing member 2C by a key spring 900. The following describes a configuration of each of these members in detail.

The first rotational member 15 is rotatably supported by a ball bearing 16 placed between the first rotational member 15 and a first housing member 101. The first rotational member 15 integrally includes: a shaft portion 151 supported by the ball bearing 16; a flange portion 152 formed so as to project radially outwardly from a second-rotational-member-14-side end of the shaft portion 151; a spline portion 153 serving as a first meshing portion formed in an outer periphery of the flange portion 152; and a cylindrical portion 154 extending from an axial end of the flange portion 152 on a second-rotational-member-14 side (an opposite side to the shaft portion 151) further toward the second rotational member 14.

An outside diameter of the cylindrical portion 154 is formed so as to be smaller than an outside diameter of the flange portion 152, and an outer peripheral surface 154a thereof frictionally slides over the friction member 8, thereby causing a friction torque that synchronizes a rotation of the first rotational member 15 with a rotation of the second rotational member 14. That is, in the present embodiment, the outer peripheral surface 154a of the cylindrical portion 154 of the first rotational member 15 corresponds to the first friction surface of the present invention.

The meshing member 2C integrally includes: a cylindrical portion 25 provided with a spline portion 251 formed on an inner peripheral surface of the cylindrical portion 25 so as to serve as a second meshing portion meshed with the spline portion 153 of the first rotational member 15; and an annular pressed portion 26 formed in one axial end of the cylindrical portion 25 so as to project inwardly. A rolling bearing 6 abuts with one end surface of the pressed portion 26 in an axial direction of the meshing member 2C, and a plurality of coil springs 200 abuts with the other end surface thereof. The coil springs 200 bias the meshing member 2C toward the cam member 5, and in response to an axial movement of the armature 4, the cam member 5 axially moves the meshing member 2C toward the first rotational member 15 against a biasing force of the coil springs 200.

FIG. 21 illustrates the second rotational member 14. FIG. 21A is a view illustrating an axial end surface of the second rotational member 14 viewed from a first-rotational-member-15 side along the rotation axis O, FIG. 21B is a sectional view taken along a line A-A in FIG. 21A, and FIG. 21C is a view illustrating an axial end surface of the second rotational member 14 viewed from an opposite side to the first-rotational-member-15 side (a side closer to an opening 102a of a second housing member 102) along the rotation axis O.

The second rotational member 14 has a bottomed cylindrical shape in which a shaft accommodation hole 14a in which to accommodate one end of a shaft 100 is formed in a center. An inner peripheral spline portion 14b splined to an outer peripheral spline portion 100a of the shaft 100 is formed on an inner surface of the shaft accommodation hole 14a. The second rotational member 14 and the shaft 100 are connected in a relatively non-rotatable manner due to splining between the inner peripheral spline portion 14b and the outer peripheral spline portion 100a, and an axial relative movement thereof is regulated by a snap ring 100c.

The second rotational member 14 integrally includes: a cylindrical portion 140 in which the shaft accommodation hole 14a is formed; a bottom portion 141 having an axial bottom face 14c of the shaft accommodation hole 14a; a boss portion 142 axially projecting from that surface of the bottom portion 141 which is opposite to the bottom face 14c; a flange portion 143 formed so as to project radially outwardly from an outer peripheral surface 140a of the cylindrical portion 140; and a spline portion 144 formed in an outer periphery of the flange portion 143.

The cylindrical portion 140 includes: a large diameter portion 140a to which the cam member 5 is outwardly engaged; and a small diameter portion 140b formed in that end of the cylindrical portion 140 which is opposite to the bottom portion 141, so as to be supported by a ball bearing 18. The flange portion 143 is formed so as to project radially outwardly from the large diameter portion 140a, and the cam member 5 is outwardly engaged with that part of the large diameter portion 140a which is closer to the small diameter portion 140b than the flange portion 143. The cam member 5 is loosely fitted to the large diameter portion 140a of the cylindrical portion 140, and is axially movable and relatively rotatable relative to the second rotational member 14.

The flange portion 143 has a plurality of spring accommodation holes 143a in each of which to accommodate one end of each of the plurality of coil springs 200, and the plurality of spring accommodation holes 143a is formed so as to be opened toward the small diameter portion 140b. Further, the flange portion 143 has an annular key-spring accommodation portion 143b in which to accommodate the key spring 900, and the key-spring accommodation portion 143b is formed so as to be opened toward the boss portion 142. Furthermore, the flange portion 143 includes a plurality of key accommodation grooves 143c formed so as to be hollowed radially inwardly from an outer peripheral surface of the flange portion 143. Each of the key accommodation grooves 143c accommodates therein an end of a key 9.

The key-spring accommodation portion 143b is formed in a whole circumference of the flange portion 143 along a circumferential direction of the second rotational member 14. The key accommodation groove 143c communicates with the key-spring accommodation portion 143b so that the key 9 of which one end is accommodated in the key accommodation groove 143c receives, from the key spring 900, a biasing force toward a radially outward direction of the second rotational member 14.

In the present embodiment, three key accommodation grooves 143c are formed in the flange portion 143 at regular intervals every in a circumferential direction, and nine spring accommodation holes 143a are formed between the three key accommodation grooves 143c. That is, three spring accommodation holes 143a are formed between a pair of key accommodation grooves 143c adjacent to each other in the circumferential direction.

Further, in the present embodiment, a plurality of (two) key springs 900 is accommodated in the key-spring accommodation portion 143b. Each of the key springs 900 is an elastic member made from a C-shaped spring steel, for example, and is accommodated in the key-spring accommodation portion 143b in a state where the each of the key springs 900 is elastically deformed by the plurality of keys 9 so as to be reduced in diameter.

The spline portion 251 of the meshing member 2C is splined to the spline portion 144 of the second rotational member 14. Due to the splining, the meshing member 2C is connected to the second rotational member 14 so as to be axially movable but relatively non-rotatable relative to the second rotational member 14.

Figure 22A:
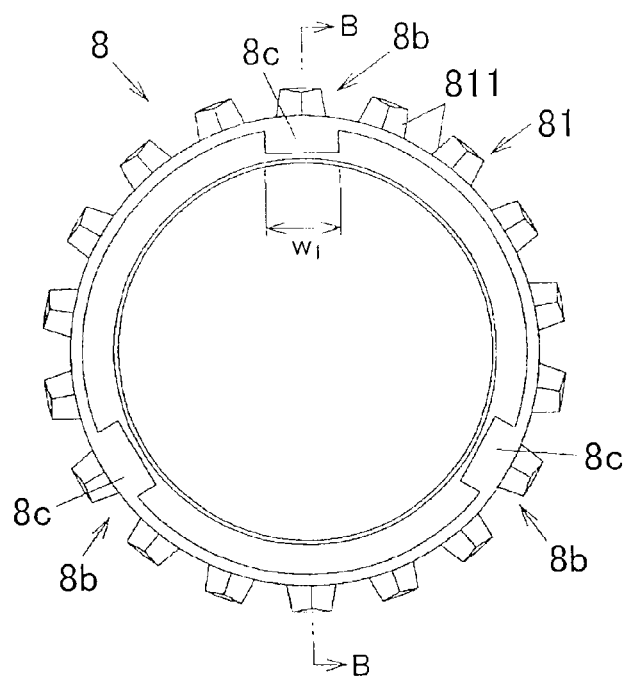
FIG. 22A is a plane view of a friction member according to the fourth embodiment.
Figure 22B:
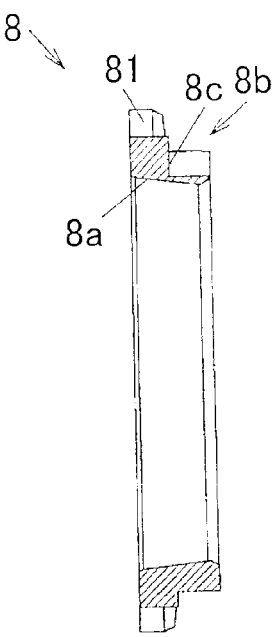
FIG. 22B is a plane view of the friction member according to the fourth embodiment.
Figure 22C:
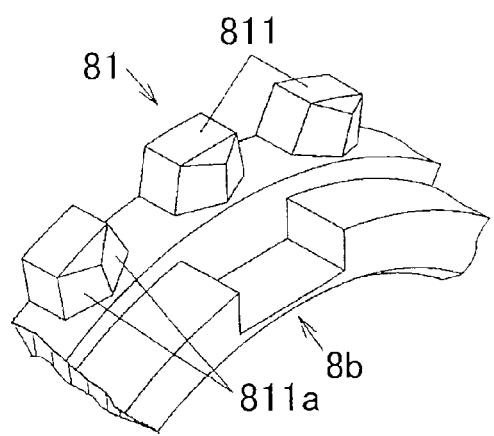
FIG. 22C is an enlarged perspective view of an outer peripheral portion of the friction member according to the fourth embodiment.

FIG. 22 illustrates the friction member 8. FIG. 22A is a view of an axial end surface of the friction member 8 viewed from a flange-portion-143 side of the second rotational member 14 along the rotation axis O, FIG. 22B is a sectional view taken along a line B-B in FIG. 22A, and FIG. 22C is an enlarged perspective view of part of an outer periphery of the friction member 8 viewed from the flange-portion 143 side.

The friction member 8 has a ring shape outwardly engaged with the cylindrical portion 154 of the first rotational member 15, and its inner peripheral surface 8a is opposed to the outer peripheral surface 154a of the cylindrical portion 154 of the first rotational member 15. The outer peripheral surface 154a is a tapered surface formed to be inclined with respect to an axial direction parallel to the rotation axis O so that its outside diameter is reduced toward an axial tip side of the cylindrical portion 154. The inner peripheral surface 8a of the friction member 8 is a tapered surface formed to be parallel to the outer peripheral surface 154a of the cylindrical portion 154.

The friction member 8 is axially movable relative to the first rotational member 15, and when the inner peripheral surface 8a is axially pressed against the outer peripheral surface 154a of the cylindrical portion 154, a friction torque is caused between the friction member 8 and the first rotational member 15. That is, in the present embodiment, the inner peripheral surface 8a of the friction member 8 corresponds to the second friction surface of the present invention.

Further, a key accommodation groove 8b in which to accommodate an end of the key 9 is formed in the friction member 8. In the present embodiment, three key accommodation grooves 8b are formed at regular intervals in a circumferential direction so as to correspond to three key accommodation grooves 143c formed in the flange portion 143 of the second rotational member 14. Further, a spline portion 81 provided with a plurality of spline teeth 811 is formed in an outer periphery of the friction member 8. Each of the spline teeth 811 has a pair of chamfer surfaces 811a inclined symmetrically from a central part of a tooth flank on a key-accommodation-groove-8b side in an axial direction parallel to the rotation axis O with the central part being taken as a vertex.

Figure 23A:
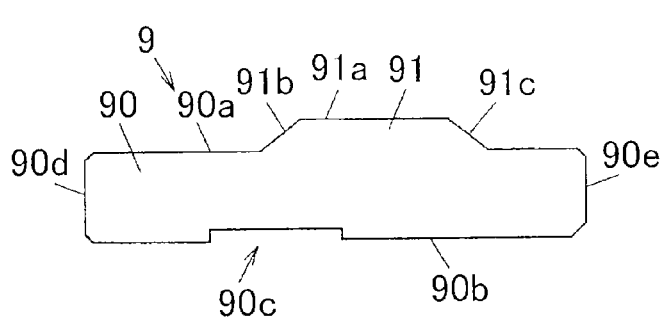
FIG. 23A is a plane view of a key.
Figure 23B:
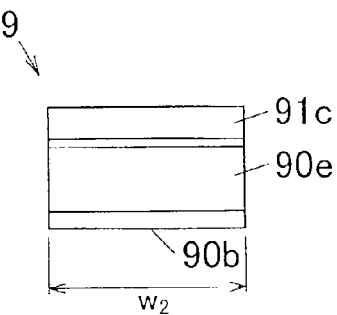
FIG. 23B is a side view of the key.
Figure 23C:
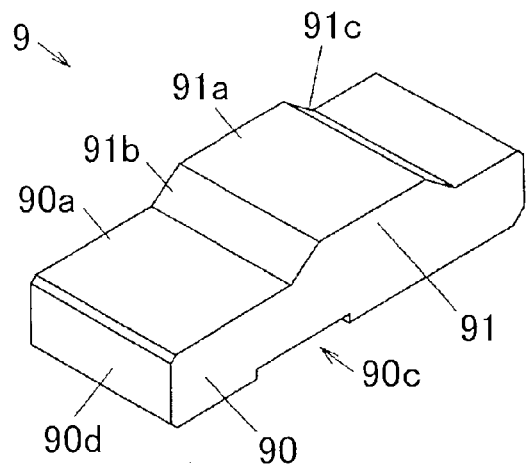
FIG. 23C is a perspective view of the key.

FIG. 23 illustrates the key 9. FIG. 23A is a side view of the key 9, FIG. 23B is a view of an axial end surface of the key 9 viewed from a cam-member-5 side, and FIG. 23C is a perspective view of the key 9.

The key 9 integrally includes: a base portion 90 having a rectangular solid shape; and a projection portion 91 formed so as to project toward the cylindrical portion 21 of the meshing member 2C from an outer surface 90a of the base portion 90 opposed to the cylindrical portion 21 of the meshing member 2C. The projection portion 91 is formed as a flat plane of which a tip end surface 91a in a projection direction of the projection portion 91 is parallel to the outer surface 90a of the base portion 90. Further, in both ends of the projection portion 91 in that longitudinal direction of the key 9 which is parallel to the rotation axis O, the tip end surface 91a of the projection portion 91 is connected to the outer surface 90a of the base portion 90 via inclined surfaces 91b, 91c. An angle formed between the outer surface 90a of the base portion 90 and each of the inclined surfaces 91b, 91c is an obtuse angle, and the projection portion 91 is formed in a bell shape in a side view illustrated in FIG. 23A.

The key 9 is placed so that one end surface 90d in a longitudinal direction of the base portion 90 is opposed to an axial bottom face 8c of the key accommodation groove 8b of the friction member 8, and the other end surface 90e in the longitudinal direction of the base portion 90 is opposed to the pressed portion 26 of the meshing member 2C. The inclined surface 91b of the projection portion 91 is formed closer to the one end surface 90d than the tip end surface 91a, and the inclined surface 91c is formed closer to the other end surface 90e than the tip end surface 91a.

Further, a hollow portion 90c formed to be hollowed toward the outer surface 90a is formed on an inner surface 90b on a backside of the base portion 90 of the key 9, relative to the outer surface 90a. As illustrated in FIG. 20, the plurality of key springs 900 is fitted in the hollow portion 90c.

As illustrated in FIG. 20, a recessed portion 250 to which the projection portion 91 of the key 9 is elastically engaged is formed in the spline portion 251 of the meshing member 2C. The recessed portion 250 is formed such that a radial height of a plurality of spline head parts 251b constituting the spline portion 251 of the meshing member 2C is partially lowered in an axial direction.

The plurality of keys 9 is elastically engaged with the meshing member 2C within a predetermined range where the spline portion 251 is not meshed with the spline portion 153 of the first rotational member 15, out of an range of an axial movement of the meshing member 2C. More specifically, the projection portions 91 of the keys 9 elastically lock the recessed portion 250 of the meshing member 2C in a state where a locking portion 19 locks a first locked portion 51 of the cam member 5. In a state where the locking portion 19 locks a third locked portion 53 or a fourth locked portion 54 of the cam member 5, the plurality of keys 9 moves inwardly in a radial direction of the second rotational member 14 due to an axial movement of the meshing member 2C, so that the projection portions 91 thereof are separated from the recessed portion 250 of the meshing member 2C. That is, due to the axial movement of the meshing member 2C from a predetermined range where the spline portion 251 of the meshing member 2C is not meshed with the spline portion 153 of the first rotational member 15 to a position where the spline portions 251, 153 are meshed with each other, the projection portions 91 of the keys 9 are separated from the recessed portion 250 of the meshing member 2C.

When a first state (see FIG. 16A) where the locking portion 19 locks the first locked portion 51 of the cam member 5 is shifted to a second state where the armature 4 presses the cam member 5 toward the meshing member 2C, the inner peripheral surface 8a of the friction member 8 is axially pressed against the outer peripheral surface 154a of the cylindrical portion 154 of the first rotational member 15, thereby causing a friction torque that synchronizes a rotation of the first rotational member 15 with a rotation of the second rotational member 14. That is, even in a case where there is a rotation speed difference between a rotation speed of the first rotational member 15 and a rotation speed of the second rotational member 14, the rotational speed difference is reduced by the friction torque, thereby resulting in that the spline portion 251 of the meshing member 2c is smoothly splined to the spline portion 153 of the first rotational member 15.

Figure 24A:
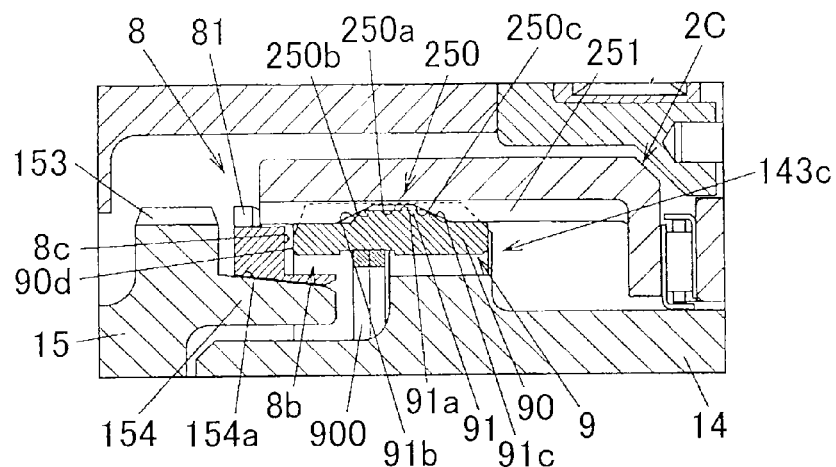
FIG. 24A is an operation explanatory view to describe an operation of the electromagnetic clutch device.
Figure 24B:
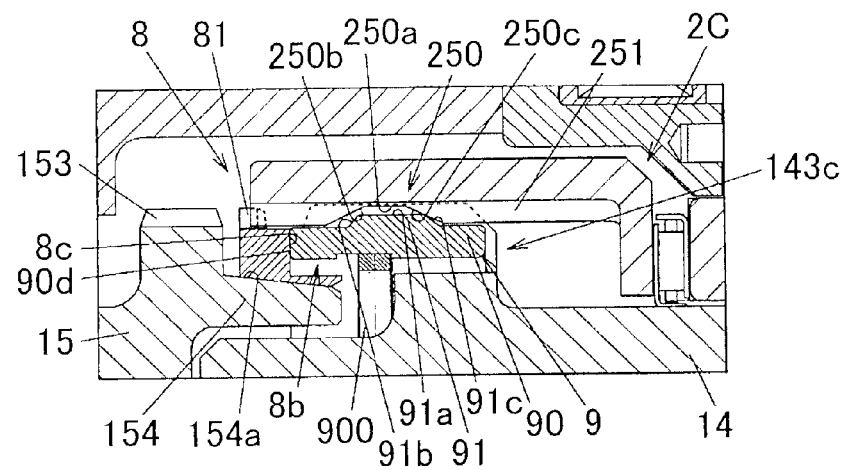
FIG. 24B is an operation explanatory view to describe the operation of the electromagnetic clutch device.
Figure 24C:
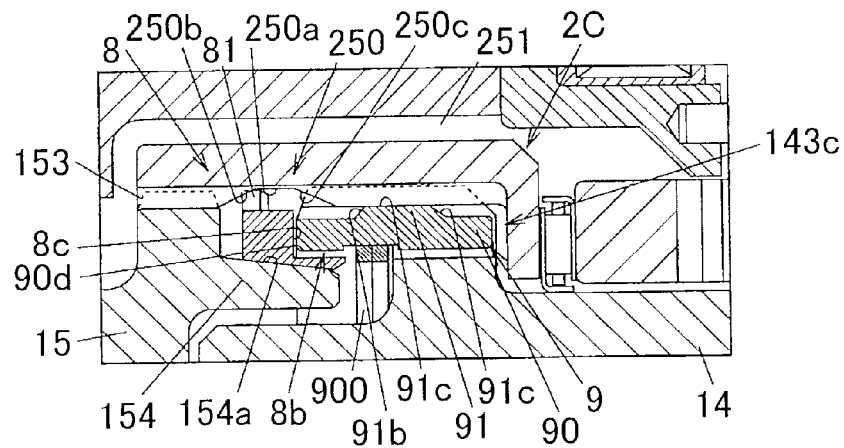
FIG. 24C is an operation explanatory view to describe the operation of the electromagnetic clutch device.

FIGS. 24A to 24C are operation explanatory views to describe an operation of the electromagnetic clutch device 1B.

FIG. 24A illustrates an uncoupled state in which the meshing member 2C is placed within the predetermined range where the spline portion 251 is not meshed with the spline portion 153 of the first rotational member 15, in the range of the axial movement of the meshing member 2C, and the first rotational member 15 and the second rotational member 14 are rotatable relative to each other. In the uncoupled state, the projection portion 91 of the key 9 is fitted to the recessed portion 250 of the meshing member 2C. The recessed portion 250 of the meshing member 2C has a bottom face 250a opposed to the tip end surface 91a of the projection portion 91, an inclined surface 250b opposed to one inclined surface 91b of the projection portion 91, and an inclined surface 250c opposed to the other inclined surface 91c of the projection portion 91.

FIG. 24B illustrates a state where the armature 4 presses the cam member 5 toward the meshing member 2C in the uncoupled state, and due to fitting between the projection portion 91 of the key 9 and the recessed portion 250 of the meshing member 2C, one end surface 90d of the base portion 90 of the key 9 in the longitudinal direction is pressed against the bottom face 8c of the key accommodation groove 8b of the friction member 8.

The friction member 8 receives an axial pressing force of the armature 4 via the plurality of keys 9, so that the inner peripheral surface 8a is pressed against the outer peripheral surface 154a of the cylindrical portion 154 of the first rotational member 15 so as to cause a friction torque. When the meshing member 2C further axially moves, the axial pressing force of the armature 4 is received by the chamfer surfaces 811a, thereby increasing the friction torque. After that, the spline portion 251 of the meshing member 2C is splined to the spline portion 81 of the friction member 8. The key accommodation groove 8b of the friction member 8 is configured such that a width w1 of the key accommodation groove 8b in a circumferential direction of the friction member 8 is wider than a width w2 of the base portion 90 of the key 9 in the circumferential direction so that the spline portion 251 of the meshing member 2C is splined to the spline portion 81 in a state where one end of the key 9 is accommodated in the key accommodation groove 8b. A difference between the width w1 (see FIG. 22A) of the key accommodation groove 8b and the width w2 (see FIG. 23B) of the base portion 90 of the key 9 corresponds to a half phase of a spline pitch of the spline portion 81.

FIG. 24C is a coupled state of the first rotational member 15 and the second rotational member 14 in which coupled state the meshing member 2C further axially moves toward the first rotational member 15, and the spline portion 251 is meshed with the spline portion 153 of the first rotational member 15.

In a course of shifting from the state illustrated in FIG. 24B to the state illustrated in FIG. 24C, the key 9 moves radially inwardly so as to be distanced from the cylindrical portion 25 of the meshing member 2C inside the key accommodation groove 8b of the friction member 8 and the key accommodation groove 143c of the second rotational member 14, so that the projection portion 91 of the key 9 is separated from the recessed portion 250 of the meshing member 2C. That is, the key 9 moves radially inwardly against a biasing force of the key springs 900, due to abutment of the inclined surface 91c of the projection portion 91 with the inclined surface 250c of the recessed portion 250 of the meshing member 2C.

Further, when the armature 4 further reciprocates between a first position and a second position from the coupled state illustrated in FIG. 24C and the locking portion 19 locks the first locked portion 51 of the cam member 5, the meshing member 2C axially moves toward the locking portion 19 due to a biasing force of the coil springs 200. Hereby, the meshing between the spline portion 251 of the meshing member 2C and the spline portion 153 of the first rotational member 15 is released, thereby causing the first rotational member 15 and the second rotational member 14 to be in the uncoupled state.

According to the sixth embodiment described above, since the inner peripheral surface 8a of the friction member 8 is axially pressed against the outer peripheral surface 154a of the cylindrical portion 154 of the first rotational member 15 via the plurality of keys 9 so as to cause a friction torque, it is possible to mesh the spline portion 251 of the meshing member 2C with the spline portion 153 of the first rotational member 15 after a rotation of the first rotational member 15 is synchronized with a rotation of the second rotational member 14. Accordingly, even in a case where the first rotational member 15 and the second rotational member 14 rotate relative to each other with a rotational speed difference, it is possible to smoothly shift from the uncoupled state to the coupled state.

Further, after a friction torque is caused between the friction member 8 and the first rotational member 15, the plurality of keys 9 is separated from the recessed portion 250 of the meshing member 2C due to a further movement of the meshing member 2C toward the first rotational member 15. Accordingly, it is possible to mesh the spline portion 251 of the meshing member 2C with the spline portion 153 of the first rotational member 15 without disturbing the axial movement of the meshing member 2C.

The electromagnetic clutch device 1 of the present invention has been described above based on the third to sixth embodiments. However, the present invention is not limited to these embodiments, and is performable in various modifications within a range which does not deviate from the gist of the present invention. For example, it is also possible to use the electromagnetic clutch device 1 for purposes except for a purpose of transmitting a driving force of a vehicle.

What is claimed is:

1. An electromagnetic clutch device configured to connect a first rotational member to a second rotational member in a torque transmittable manner, the electromagnetic clutch device comprising:
   a meshing member including a second meshing portion to be meshed with a first meshing portion formed in the first rotational member, the meshing member being connected to the second rotational member in an axially movable but relatively non-rotatable manner;
   an electromagnetic coil that causes a magnetic force by current application;
   an armature that axially moves due to the magnetic force;
   a cylindrical cam member that is rotatable relative to the armature and that axially moves the meshing member so that the second meshing portion is meshed with the first meshing portion; and
   a locking portion provided so as to be axially immovable relative to the first rotational member and to be non-rotatable relative to the armature, wherein:
   the cam member is provided with a plurality of locked portions to be locked by the locking portion at different axial positions of the cam member, such that the plurality of locked portions is formed adjacent to each other in a circumferential direction;
   the cam member rotates only by a first predetermined angle due to an axial movement of the armature from a first position to a second position, and the cam member further rotates only by a second predetermined angle due to a movement of the armature from the second position to the first position; and
   when locking of the locking portion is shifted from one of the plurality of locked portions to another locked portion circumferentially adjacent thereto so that the locking portion locks the another locked portion at a different axial position, the second meshing portion is meshed with the first meshing portion.

2. The electromagnetic clutch device according to claim 1, further comprising:
   a biasing member that biases the armature from the second position to the first position.

3. The electromagnetic clutch device according to claim 1, wherein:
   the armature is axially movable but non-rotatable relative to the electromagnetic coil.

4. The electromagnetic clutch device according to claim 1, wherein:
   the plurality of locked portions is formed in at least three different positions in an axial direction of the cam member; and
   when the armature repeats a movement from the first position to the second position several times, the second meshing portion of the meshing member is meshed with the first meshing member of the first rotational member.

5. The electromagnetic clutch device according to claim 1, further comprising:
   a biasing member that biases the meshing member in a direction where the second meshing portion is meshed with the first meshing portion; and
   a pressing mechanism including the locking portion that presses the meshing member against a biasing force of the biasing member due to an axial movement of the armature so as to axially move the meshing member, the locking portion being provided so as to be relatively non-rotatable relative to a housing that support the electromagnetic coil, wherein the cam member is cylindrical, the pressing mechanism being configured such that, in response to an axial movement of the armature, locking of the locking portion is shifted from one of the plurality of locked portions to another locked portion placed at a different axial position, wherein:
   when the cam member moves to an opposite side to the meshing member in response to the axial movement of the armature, the second meshing portion is meshed with the first meshing portion due to the biasing force of the biasing member.

6. The electromagnetic clutch device according to claim 5, wherein:
the plurality of locked portions is formed in at least three different positions in an axial direction of the cam member; and
the meshing member is configured such that, when a state where the locking portion locks a locked portion formed in a position farthest from the meshing member among the plurality of locked portions is released so that the locking portion locks a locked portion formed in a position nearest to the meshing member, the second meshing portion is meshed with the first meshing portion due to the biasing force of the biasing member.

7. The electromagnetic clutch device according to claim 5, wherein:
in the cam member, the plurality of locked portions is formed adjacent to each other in a circumferential direction;
when the armature axially moves from a first position to a second position, the armature presses the cam member toward the meshing member so as to rotate the cam member only by a first predetermined angle; and
when the armature moves from the second position to the first position, the cam member further rotates by a second predetermined angle, so that locking of the locking portion is shifted from one of the plurality of locked portions to another locked portion adjacent thereto in the circumferential direction.

8. The electromagnetic clutch device according to claim 7, wherein:
when the armature is placed in the first position, the locking portion abuts with an axial end surface and a circumferential side surface of the locked portion, and the pressing projection of the armature is opposed to the axial end surface in a position distanced from the side surface in the circumferential direction of the cam member; and
when the armature moves to the second position, the cam member rotates by the first predetermined angle, so that the pressing projection abuts with the side surface and the locking portion is opposed to an axial end surface of the another locked portion.

9. The electromagnetic clutch device according to claim 5, wherein:
the second meshing portion of the meshing member is always meshed with the first meshing member; and
when the meshing member axially moves, the second meshing portion is also meshed with the second rotational member, so that the first rotational member is connected to the second rotational member in a torque transmittable manner.

10. The electromagnetic clutch device according to claim 5, wherein:
the pressing mechanism includes a locking portion provided so as to be axially immovable relative to the second rotational member and to be non-rotatable relative to the armature; and
in a course of shifting from an uncoupled state to a coupled state along with an axial movement of the cam member due to an axial movement of the armature, a friction torque is caused so as to synchronize a rotation of the first rotational member with a rotation of the second rotational member.

11. The electromagnetic clutch device according to claim 10, wherein:
the friction torque is caused when a second friction surface on a first-rotational-member side is axially pressed against a first friction surface on a second-rotational-member side due to the axial movement of the cam member.

12. The electromagnetic clutch device according to claim 11, wherein:
the armature performs a pressing operation to press the cam member toward the meshing member before the locking portion locks the another locked portion; and
the second friction surface is pressed against the first friction surface due to the pressing operation.

13. The electromagnetic clutch device according to claim 12, wherein:
the second friction surface is formed in a friction member axially movable relative to the second rotational member; and
the friction member receives a pressing force toward the second rotational member via an engage and disengage member to be elastically engaged with the meshing member within a predetermined range where the second meshing portion is not meshed with the first meshing portion in an axially movable range of the meshing member.

14. The electromagnetic clutch device according to claim 13, wherein:
the engage and disengage member and the meshing member are configured such that a projection portion formed in either one of the engage and disengage member and the meshing member is elastically engaged with a recessed portion formed in the other one thereof; and
the projection portion is separated from the recessed portion due to an axial movement of the meshing member from the predetermined range to a position in which the second meshing portion is meshed with the first meshing portion.

15. The electromagnetic clutch device according to claim 12, wherein:
the second friction surface is formed in the meshing member.

16. The electromagnetic clutch device according to claim 15, wherein:
the first friction surface and the second friction surface are tapered surfaces inclined in the axial direction.

17. The electromagnetic clutch device according to claim 12, wherein:
the first rotational member includes a cylindrical fixing member, and a moving member projecting radially outwardly and provided so as to be axially movable but relatively non-rotatable relative to the fixing member; and
the moving member is placed between the second rotational member and the meshing member.

18. The electromagnetic clutch device according to claim 5, wherein:
the plurality of locked portions is formed in at least three different positions in the axial direction of the cam member.

19. An electromagnetic clutch device configured to connect a first rotational member to a second rotational member in a torque transmittable manner, the electromagnetic clutch device comprising:
a meshing member including a second meshing portion to be meshed with a first meshing portion formed in the first rotational member, the meshing member being connected to the second rotational member in an axially movable but relatively non-rotatable manner;

an electromagnetic coil that causes a magnetic force by current application;
an armature that axially moves due to the magnetic force;
a cylindrical cam member that axially moves the meshing member so that the second meshing portion is meshed with the first meshing portion; and
a locking portion provided so as to be axially immovable relative to the first rotational member and to be non-rotatable relative to the armature, wherein:
the cam member is provided with a plurality of locked portions to be locked by the locking portion at different axial positions of the cam member, such that the plurality of locked portions is formed adjacent to each other in a circumferential direction;
the cam member rotates only by a first predetermined angle due to an axial movement of the armature from a first position to a second position, and the cam member further rotates only by a second predetermined angle due to a movement of the armature from the second position to the first position; and
when locking of the locking portion is shifted from one of the plurality of locked portions to another locked portion circumferentially adjacent thereto so that the locking portion locks the another locked portion at a different axial position, the second meshing portion is meshed with the first meshing portion, wherein:
the plurality of locked portions includes a first locked portion and a second locked portion, each locked by the locking portion at a different axial position;
the first locked portion and the second locked portion are formed alternately in the circumferential direction, and when the armature reciprocates between the first position and the second position several times, a state where the locking portion locks the first locked portion and a state where the locking portion locks the second locked portion are switched; and
when the locking portion locks the second locked portion, the first meshing portion is meshed with the second meshing portion, and when the locking portion locks the first locked portion, the meshing between the first meshing portion and the second meshing portion is released.

20. An electromagnetic clutch device configured to connect a first rotational member to a second rotational member in a torque transmittable manner, the electromagnetic clutch device comprising:
a meshing member including a second meshing portion to be meshed with a first meshing portion formed in the first rotational member, the meshing member being connected to the second rotational member in an axially movable but relatively non-rotatable manner;
an electromagnetic coil that causes a magnetic force by current application;
an armature that axially moves due to the magnetic force;
a cylindrical cam member that axially moves the meshing member so that the second meshing portion is meshed with the first meshing portion; and
a locking portion provided so as to be axially immovable relative to the first rotational member and to be non-rotatable relative to the armature, wherein:
the cam member is provided with a plurality of locked portions to be locked by the locking portion at different axial positions of the cam member, such that the plurality of locked portions is formed adjacent to each other in a circumferential direction;
the cam member rotates only by a first predetermined angle due to an axial movement of the armature from a first position to a second position, and the cam member further rotates only by a second predetermined angle due to a movement of the armature from the second position to the first position; and
when locking of the locking portion is shifted from one of the plurality of locked portions to another locked portion circumferentially adjacent thereto so that the locking portion locks the another locked portion at a different axial position, the second meshing portion is meshed with the first meshing portion, wherein:
the cam member is configured such that an axial end surface of each of the plurality of locked portions is formed so as to be inclined in the circumferential direction, and the cam member receives an axial biasing force at which the axial end surface is pressed against the locking portion;
the armature includes a pressing projection that presses the cam member toward the meshing member by abutting with the axial end surface of the cam member; and
the cam member rotates by the first predetermined angle due to sliding between the axial end surface and the pressing projection.

21. The electromagnetic clutch device according to claim 20, wherein:
when the axial end surface of the cam member that receives the biasing force slides over the locking portion, the cam member rotates relative to the locking portion by the second predetermined angle.

22. The electromagnetic clutch device according to claim 21, wherein:
when the armature is placed in the first position, the locking portion abuts with a wall surface of the locked portion in a circumferential direction of the cam member and the axial end surface thereof; and
when the armature moves to the second position, the cam member rotates by the first predetermined angle so that the pressing projection abuts with the wall surface and the locking portion is opposed to the axial end surface of the another locked portion.

23. The electromagnetic clutch device according to claim 20, further comprising:
a rolling bearing placed between the meshing member and the cam member; and
an elastic member that elastically presses the meshing member toward the cam member, wherein:
the cam member receives a pressing force of the elastic member as the biasing force from the meshing member via the rolling member.

* * * * *